United States Patent
Ciulis et al.

(10) Patent No.: US 11,663,797 B2
(45) Date of Patent: *May 30, 2023

(54) SYSTEM AND METHOD FOR PROVIDING A SIMULATED VISUALIZATION OF PRODUCT PERSONALIZED WITH USER SELECTED ART

(71) Applicant: CreateMe Technologies LLC, New York, NY (US)

(72) Inventors: Oto Ciulis, San Diego, CA (US); Jason Bennett, New Canaan, CT (US)

(73) Assignee: CreateMe Technologies LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/219,802

(22) Filed: Mar. 31, 2021

(65) Prior Publication Data

US 2022/0318875 A1   Oct. 6, 2022

(51) Int. Cl.
  *G06T 19/20*   (2011.01)
  *G06Q 30/0601*   (2023.01)
  *G06T 17/20*   (2006.01)

(52) U.S. Cl.
  CPC ......... *G06T 19/20* (2013.01); *G06Q 30/0621* (2013.01); *G06Q 30/0643* (2013.01); *G06T 17/20* (2013.01); *G06T 2200/24* (2013.01); *G06T 2210/16* (2013.01); *G06T 2219/2012* (2013.01); *G06T 2219/2016* (2013.01)

(58) Field of Classification Search
  None
  See application file for complete search history.

(56) References Cited

U.S. PATENT DOCUMENTS

| | | | | |
|---|---|---|---|---|
| 6,310,627 B1* | 10/2001 | Sakaguchi | .............. | G06T 15/00 345/630 |
| 2014/0229426 A1* | 8/2014 | Gootee, III | ............. | G06F 30/13 707/608 |
| 2015/0066189 A1* | 3/2015 | Mulligan | ........... | G06Q 30/0621 700/136 |
| 2015/0351477 A1* | 12/2015 | Stahl | ....................... | G06T 15/04 700/132 |
| 2019/0004688 A1 | 1/2019 | Bowen | | |

(Continued)

OTHER PUBLICATIONS

International Patent Application No. PCT/US2022/022901, "International Search Report and Written Opinion", dated Jul. 18, 2022, 12 pages.

(Continued)

*Primary Examiner* — Sarah Le

(57) ABSTRACT

A method of generating garment images embellished with a personalization art image is disclosed. Creating a garment type, based on a business user input including receiving information related to garment parts available options in colors, fabrics, lighting conditions, camera viewpoints poses related to the garment, generating a garment part image for each distinct combination of garment part fabric, garment part color, lighting condition, camera viewpoint and pose, storing each garment image, receiving a selection of available customization windows corresponding to the garment, and displaying to an end-user, a user selected garment image, embellished with a selected personalization art located in a selected customization window.

10 Claims, 18 Drawing Sheets

(56) References Cited

U.S. PATENT DOCUMENTS

2019/0021426 A1    1/2019  Barnes et al.
2021/0165918 A1*  6/2021  Bowen ................. G06K 9/6253

OTHER PUBLICATIONS

"Tutorial: How To Make Transparent/Sheer Clothing", Available Online at: https://ikari-sims.tumblr.com/post/87462057102/tutorial-how-to-make-transparentsheer-clothing, 2014, pp. 1-13.

U.S. Appl. No. 17/709,215, "Non-Final Office Action", dated Jul. 21, 2022, 104 pages.

* cited by examiner

| | A | B | C | D | E | F | G | H | I | J | K | L | M | N |
|---|---|---|---|---|---|---|---|---|---|---|---|---|---|---|
| 1 | Logo Here | | | | | | | Graded Specs | | | | | | |
| 2 | | Product #: | | | Season: | | | | | | Vendor: | | | |
| 3 | | Product Name: | | Short Slv Crew | Year: | | | | | | COO: | | | |
| 4 | | Block #: | | 0 | Size Range: | | | | XS-XXL | | Tech Pack Due | | | |
| 5 | Sketch Here | Reference Product #: | | Gildan Lt. Grey | Product Category: | | | | XS-XXL | | Bulk Ship Date | | | |
| 6 | | Main Fabric: | | 0 | Product Type: | | | | T-Shirt | | Created By | | | |
| 7 | | Product Treatment: | | 0 | Product Class: | | | | | | Created Date | | | |
| 8 | | | | | Product Sub Class: | | | | Short Sleeve | | Modified By | | | |
| 9 | | Description: | | | | | | | 0 | | Modified Date | | | |
| 10 | Code | Point of Measure | | TOL +/- | XS | S | Mens Slim Cut S/S Crew Neck T-Shirt M | L | XL | XXL | | | | NO |
| 11 | | Chest Width 1" Below Armhole | | | 18 3/4 | 20 3/4 | 22 3/4 | 24 3/4 | 26 3/4 | 28 3/4 | | | | |
| 12 | | Bottom Width (Along Edge) | | | 19 | 21 | 23 | 25 | 27 | 29 | | | | |
| 13 | | Front Body Length Down from HPS | | | 27 | 28 | 29 | 30 | 31 | 32 | | | | |
| 14 | | Across Shoulder Width (Seam to Seam) | | | 18 | 19 | 20 | 21 | 22 | 23 | | | | |
| 15 | | Across Front 6" Down from HPS (Seam to Seam) | | | 16 1/2 | 17 3/4 | 19 | 20 1/4 | 21 1/2 | 22 3/4 | | | | |
| 16 | | Neck Width (Seam to Seam) | | | 6 1/4 | 6 3/4 | 7 1/4 | 7 3/4 | 8 1/4 | 8 3/4 | | | | |
| 17 | | Front Neck Drop Down from HPS to Seam | | | 4 1/2 | 4 1/2 | 4 1/2 | 4 1/2 | 4 1/2 | 4 1/2 | | | | |
| 18 | | Back Neck Drop Down from HPS to Seam | | | 1 | 1 | 1 | 1 | 1 | 1 | | | | |
| 19 | | Neck Rib Height | | | 1 | 1 | 1 | 1 | 1 | 1 | | | | |
| 20 | | Sleeve Length Out from CBN | | | 17 3/4 | 18 1/4 | 18 3/4 | 19 1/4 | 19 3/4 | 20 1/4 | | | | |
| 21 | | Muscle Width 1" Below Under Arm | | | 8 | 8 1/2 | 9 | 9 1/2 | 10 | 10 1/2 | | | | |
| 22 | | Sleeve Opening Width Along Edge | | | 6 3/4 | 7 | 7 1/4 | 7 1/2 | 7 3/4 | 8 | | Revised Grade to Si | | |
| 23 | | Armhole Straight (Shoulder PT to Side Seam) | | | 10 | 10 1/2 | 11 | 11 1/2 | 12 | 12 1/2 | | | | |
| 24 | | Back Body Length frm CBN | | | 25 | 26 | 27 | 28 | 29 | 30 | | | | |
| 25 | | Across Back 6" Down from HPS (Seam to Seam) | | | 16 1/2 | 17 3/4 | 19 | 20 1/4 | 21 1/2 | 22 3/4 | | | | |
| 26 | | Shoulder Slpe | | | 1 1/4 | 1 1/4 | 1 1/4 | 1 1/4 | 1 1/4 | 1 1/4 | | | | |

FIG. 7B

SYSTEM AND METHOD FOR PROVIDING A SIMULATED VISUALIZATION OF PRODUCT PERSONALIZED WITH USER SELECTED ART 3D models of articles such as garment models are widely used in computer-aided design and simulation to assist with the article design, processing and manufacturing, each with possible different resource needs. For example, the manufacturing process of a garment requires the highest level of detail to produce accurate items based on specification and uses specialized data formats. On the other hand, personalization or customization processes by an end-user can be done on a mobile device with limited capabilities. Due to imbalances in the required resources, a manufacturing modeling process would not be appropriate and applicable to the personalization modeling and simulation. It would be advantageous to have systems and processes that are capable of rendering high quality article images while not taxing system resources in presenting high quality images to an end-user. Such a system would enhance user experience and confidence when customizing and purchasing articles online.

BRIEF SUMMARY

The present technology relates to system and methods for providing simulated visualization of products such as apparel or their accessories customized with user selected personalization art.

Some embodiments provide for a method of generating garment images embellished with a personalization art image is disclosed. Creating a garment type, based on a business user input including receiving information related to garment parts available options in colors, fabrics, lighting conditions, camera viewpoints poses related to the garment, generating a garment part image for each distinct combination of garment part fabric, garment part color, lighting condition, camera viewpoint and pose, storing each garment image, receiving a selection of available customization windows corresponding to the garment, and displaying to an end-user, a user selected garment image, embellished with a selected personalization art located in a selected customization window.

BRIEF DESCRIPTION OF THE SEVERAL VIEWS OF THE DRAWINGS

For a fuller understanding of the nature and advantages of this invention, as well as the preferred mode of use, reference should be made to the following detailed description read in conjunction with the accompanying drawings. The drawings are not presented to scale unless specified otherwise on an individual basis.

To easily identify the discussion of any particular element or act, the most significant digit or digits in a reference number refer to the figure number in which that element is first introduced.

FIG. 7B illustrates an exemplary size chart in accordance with one embodiment.

DETAILED DESCRIPTION

Figure 1:
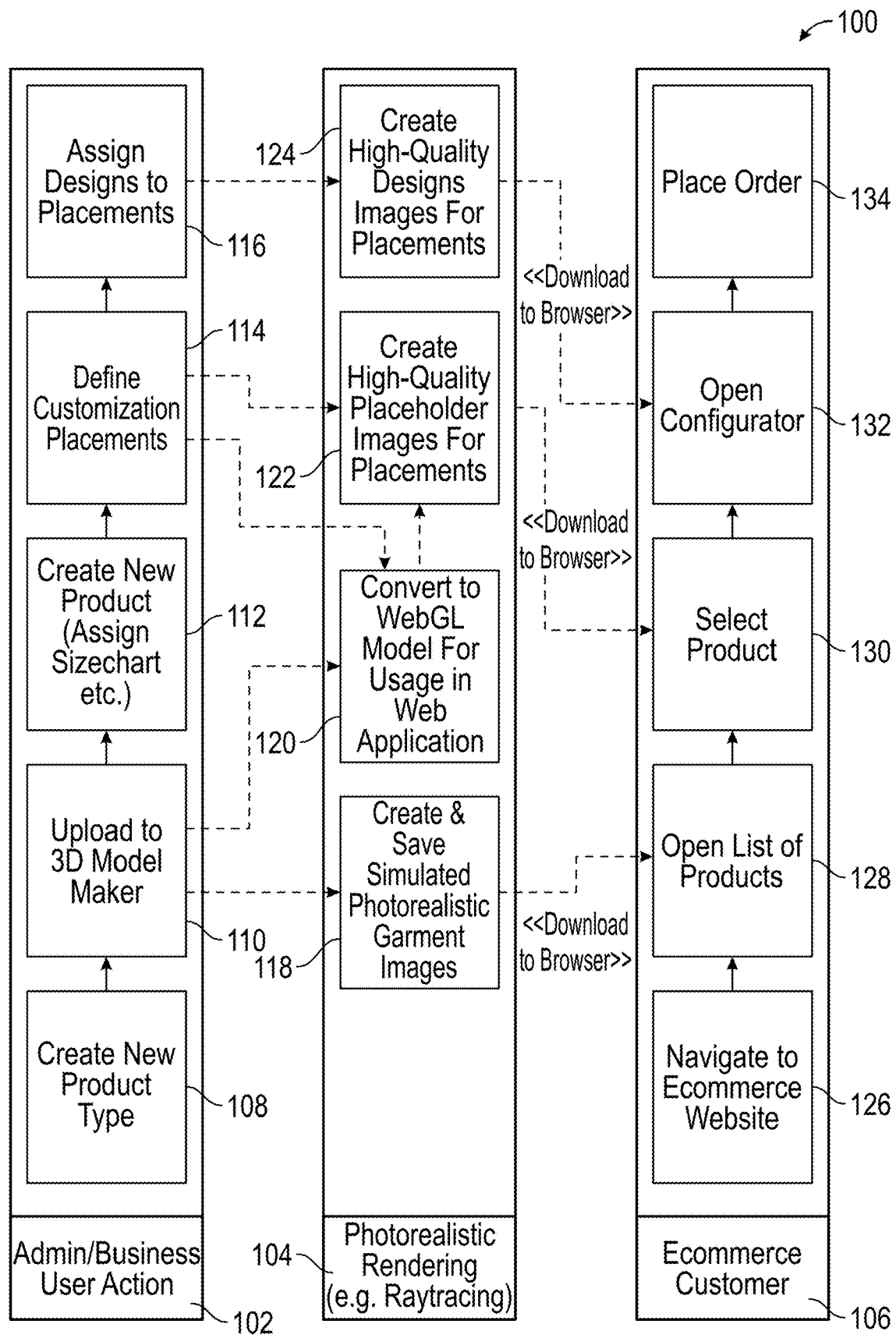
FIG. 1 illustrates an exemplary embodiment of an e-commerce system according with one embodiment.

Throughout this description, for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments. Furthermore, certain aspects of the present technology may be described as applied to a garment or article of clothing by example but not by limitation. It should be apparent to one skilled in the art that the scope and application of the present technology is not limited to garments or other articles of clothing and may be potentially applicable to any article that may be a candidate for customization and personalization.

Incorporating high quality 3D models of an article such as a garment greatly enhances the user experience and increases user confidence before completing the purchase. Additionally, customers are increasingly requiring the option to personalize their desired article. As implementations of such personalization or customization requirements grows in popularity, manufacturers, brand owners and retailers are seeking to provide personalization options to their customers, while providing a controlled and positive online interactive experience to help customers make confident purchases.

Prior art techniques may require the use of actual photographs for each choice of garment color and style alone and embellished with each available choice of personalization art. Alternatively, photorealistic image of the garment may be rendered to simulate the garment image. However, such high-quality image renderings are very resource intensive and are by nature very slow, thus introducing undesirable lag into the interactive system. Furthermore, a photorealistic image rendering may be required for each distinct combination of garment style, fabric and color superimposed with an image of the personalization art, displayed on the garment image at each choice of customization window or location. However, each of these techniques include shortcomings. The use of actual photographs of each garment style, material and fabric, color, viewpoint, camera settings, environmental lighting (e.g. Indoor vs. Outdoor), multiplied by each personalization art type and customization window location would require the creation and customization of a prohibitively large number of sample garments to obtain good quality images. Alternative techniques relying on photorealistic renderings of garment images overlaid with an image of the personalization art may not result in high quality images because in many cases, the personalization art image would not accurately follow the surface curvatures of the garment image, resulting in a unrealistic and low quality images that fails to provide customer confidence in their selection of garment and personalization art.

FIG. 1 illustrates an exemplary embodiment of an e-commerce system in accordance with one to embodiment. An exemplary e-commerce system 100 empowers a business user such as a manufacturer, a wholesaler, or a retailer to use embodiments of the present technology to create one or more portfolios of articles available to e-commerce shoppers for purchase as is or embellished with customer selected personalization art selected by the end-user from one or more libraries of available personalization art. It should be noted that throughout this disclosure, the term "customer" and "end-user" may be used interchangeably to refer to the same actor or actors. An exemplary e-commerce system 100 may include several process groupings, including business user processes group 102, image rendering processes group 104 and end-user or customer processes group 106.

With reference to business user processes group 102, a business user may be a manufacturer, a wholesaler, a brand owner, or a retailer and may use e-commerce system 100 to create and populate one or more portfolios with products that are made available for purchase by end-users as is or as personalized products customized by user selected art available from one or more libraries of personalization art. It should be noted that products or article available for personalization include apparels, shoes, accessories, linens, towels, and any other articles that may be personalized to a consumer's taste and selection.

In operation 108, a business user initiates the process of creating a new product that can be personalized with an end-user's selected personalization art. In operation 108, the business user may provide details of a garment design including the style, materials and fabrics, available colors, available sizes, etc. For the remainder of this disclosure a garment would be used as an exemplary article available for customization. It should be apparent that the applications of the systems and processes described herein are not limited to garments and may be used with other products that can be personalized.

In operation 110, specifications about the new garment is received from the business user and provided to a 3 dimensional model (3D) for creating a 3D model or representation of the garment. In some embodiments, commercially available computer aided (CAD) design or modeling tools such as Clo3D™ may be used to generate a model based on the business user's input.

In operation 112, a new product file is created for the new garment. As part of the new product file creation, a size chart may be assigned to the new garment. A size chart may include dimension and measurements to and from specific points of measure, as well as dimensions of various parts of the new garment. Size chart information may be used to calculate and accurately locate a customization window on the new garment and a locate and orient any personalization art within the customization window.

In operation 114, based on the garment design parameters, the business user may define the available customization window locations and their corresponding sizes. In an alternative embodiment, the eCommerce system may determine the appropriate customization locations and size based on the new garment information.

In operation 116, the business user may select a set of personalization art that would be available to customers as options to embellish the new garment with. The choice of available personalization art may at least partially be based on the size and location of each garment customization window. In some embodiments, the eCommerce system may automatically create or suggest to the business user, personalization art available from a library of available personalization art. In some embodiments, the personalization art may be created by famous artists and may allow only a limited number of reproductions. This artificial scarcity may positively impact the value and the desirability of the personalization art and any garment embellished with it.

In the process flow 104, garment images and personalization art images are generated based on various parameters. In operation 118, garment design information extracted from the 3D model generator may be used by an image rendering engine to create simulated high quality, photo realistic images of the garment. Each garment image may correspond to a distinct combination of garment view, garment fabric, camera viewpoint, poses and environmental lighting. Each generated garment image may be saved to storage for future retrieval.

In operation 120, the rendered garment image is used to generate a WebGL model of the garment for usage in web applications. The WebGL model or images from operation 120 may be used to help define customization placement locations.

In operation 122, using information regarding the customization window placement from operation 114 is used to generate high-quality place holder images of the customization windows. Each generated place holder image is saved to storage for future retrieval. Similarly, information from operation 116 is used in operation 124 to generate high-quality personalization images for each distinct combination of customization window, viewpoint, environmental lighting condition, personalization art finish, color, size, etc. Each generated personalization art image may be saved to storage for future retrieval.

The process flow 106 corresponds to an end-user's travel through the system 100. The end-user may be a consumer who wants to select and purchase a garment and customize it with customer selected personalization art chosen from a library of personalization art available for the garment and customization window combination. In some embodiments the end-user may be able to browse through the website as a guest and without creating an account. In alternative embodiments, an end-user may be required to create an account and a login, prior to being allowed access to the system. In some embodiments, if the end user is redirected from the website of a business user to the eCommerce platform, the end-user may be limited to only browse the business user's products offering and choice of personalization art, as selected by that business user.

Regardless of the path by which the end-user gains access to the website, he or she may be directed to the landing page of system 100 in operation 126. The landing page of system 100 may be customized to the path the end-user takes to reach the eCommerce platform 100. In alternative embodiments, all end-users may land on a generic landing page presented to all. In some embodiments, the end-user may be redirected from the website of a particular brand owner to a landing page within the system 100 customized to that brand owner. In this scenario, the end-user may be only allowed to view a list of products specific to a particular brand owner. In alternative embodiments, the end-user may be redirected by a retailer to the system 100, where the retailer may represent and offer multiple brands. In this case, the end-user may be able to view a variety of brand name products. In yet another instance, an end-user may be able to gain access to the system 100 directly and be allowed to access the entire inventory of products available on the system 100 database.

In operation 128, the end-user accesses an inventory of products from one or more brand owners, available for purchase and personalization. In some embodiments, the inventory of products may be presented as a list, as a list titles along with corresponding thumbnail images, or just a list of thumbnail images. In each case, the end-user may comb through the available choices of garments, colors, and styles of and select a garment to view, purchase and potentially personalize. Upon the selection of a garment, a photorealistic image of the chosen garment generated in operation 118 may be retrieved from storage and downloaded to the end-user's terminal. It should be noted that the speed at which each selection and retrieval of a photorealistic image of a garment is presented would be limited by the connection and communication speed between the networks of the system 100 and the end-user's device, and in most cases any lag would not exceed a few milliseconds. Therefore, the selection of each view of the garment of interest based on different parameters such as texture, viewpoint, pose, environment, etc. would appear to the end-user as seamless and fast. In each case, the end-user would be presented with a photorealistic image of the garment based on the end-user's selection in a matter of milliseconds. Therefore, the interaction between the end-user and the system 100 would appear seamless. The presentation of photorealistic images of the selected garment to the end-user in real-time would increase the customer's confidence in his or her selection and purchase. This responsiveness and seamless interaction with the eCommerce platform thus greatly enhances the end-user's shopping experience, one that is superior to existing solutions.

In operation 130, the end-user may select an article to customize. In the present exemplary description, the article may be an article of clothing, a garment. In some embodiment, after the selection of the garment, the end-user may further select how to personalize the garment with user-selected art from a library of available personalization art. In some embodiment, the business user would be able to limit which selections of art are to be made available to end-users for use in personalizing articles. Furthermore, the business user may limit the choices of placement of the art, the personalization art finish, the colors, and textures available, etc. In one embodiment, in operation 130, once the end-user has selected a garment, the garment image may be displayed showing available personalization art placement locations (aka customization windows) in each view. In some embodiments, the display of the placement locations may be automatic. In some embodiments, the placement location is displayed on the garment in response to the end-user's command. In either scenario, the customization window images rendered in operation 122 are retrieved from storage and presented to the end-user's user interface (UI) in operation 130. It should be noted that in some embodiments, images of customization windows may be displayed only with the selected personalization art.

In operation 132, the end-user may open a customization engine or configurator to select the type of art to personalize the garment, the customization window, the size and scale of the personalization art, the color and the finish (e.g. embroidery versus direct-to-garment (DTG) printing or screen printing, etc.). In operation 132, the end-user may select images representing the selected personalization art from different views, change the customization window, change the environment, change the viewpoint and other parameters, in order to get a good sense of the visual appeal of the garment embellished with the personalization art from different perspectives and in different environment, helping the end-user increase his or her level of confidence selection prior to the actual purchase and order.

In operation 134, after the end-user has explored his or her choices and has been able to satisfactorily view from different perspectives her selection of the garment adorned with the selected personalization art, the end-user may place an order for the selected garment personalized with end-user's choice of art.

Figure 2:
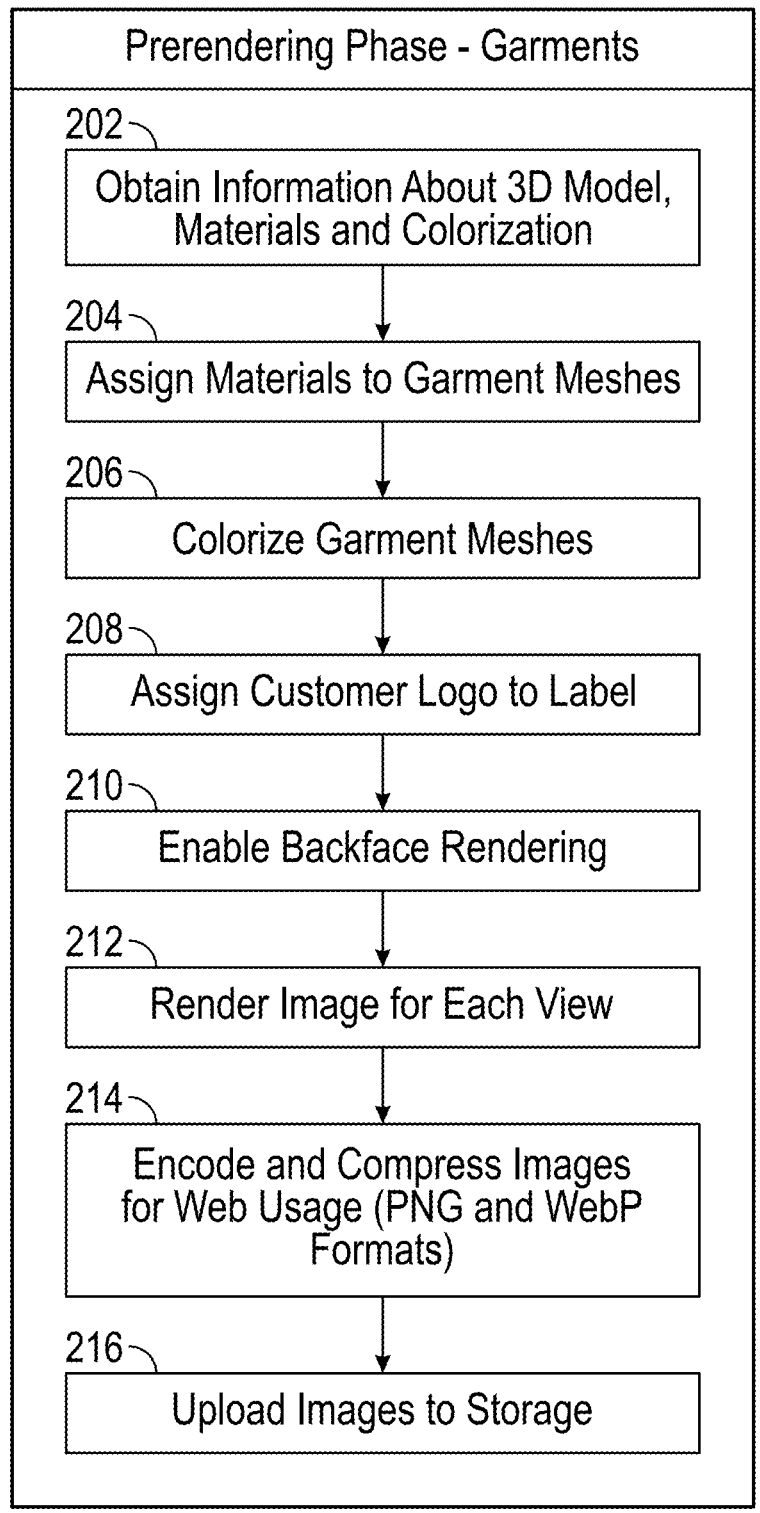
FIG. 2 illustrates a flowchart of a garment image creation process in accordance with one embodiment.

FIG. 2 illustrates a flowchart of a garment image creation process according to some exemplary embodiments of the present technology. With reference to FIG. 2, the business user's data regarding a new product (garment in the current example) is received and uploaded to the 3D model generator. Examples of the type of data that may be provided by the business user may include information about the new garment's design, style, available materials and textures and available colors and sizes. In operation 202, the garment design information is extracted from the 3D model.

In operation 204, garment materials are assigned to corresponding garment meshes. The garment may be made entirely of one material or each part of the garment may be made of a different material. In some cases, a garment may be offered with the choice of different materials as well as styles and colors. For example, the garment design may allow for the choice between a fur neckline or a velvet neckline. Each distinct garment style may require a separate image.

In operation 206, based on the garment color or colors, each corresponding mesh is colorized according to the design. In some designs, the garment may include multiple colors or multiple combinations of colors, and different types of materials. If photorealistic images of the garment are being generated, color and material options at the level of each mesh may be combined to generate the variety of garment images by combining parts. This contrasts with using photos for each combination of garment style, fabric, color, viewpoint, etc. It should be noted that each mesh can have only one material in one color assigned to it. Yet, there might be multiple options of material and color available for each mesh. For example, the available color options for a garment sleeves may include blue, green, and red, with all three sleeves available in cotton only. Similarly, the body of the garment may be made of cotton in black or white colors. In this example, two renderings of the body mesh image and three renderings of the sleeve mesh images are required to generate all the combinations of color and material options available for the garment design. Once a mesh and the corresponding skin in the correct color and material is rendered, the generated image may be combined with other meshes to form the full garment image in all available choices. In this example it would mean rendering a garment image for each combination of colors (white body+blue sleeves, white body+red sleeves, white body+green sleeves etc.).

Similarly, each garment parameter that may affect the garment visualization may require a different image. For example, each combination of garment texture, color, environment (studio lighting vs. outdoor lighting), viewpoint and pose may require a separate image.

In operation 208, a business customer or brand owner's logo may be assigned to the garment label. The visualization of the brand logo may be highly desired by brand owners and it may increase the end-user's confidence in his or her selection of the article. This is especially true in the cases where end-users seek a particular brand, and thus displaying of the brand logo may be a decisive component of the customer's buying decision.

In some embodiments, prior to rendering an image of the new product, the image rendering engine may also render images of the views of the garment that are not visible. In some embodiments, the back face rendering of a product image improves the quality of the image for the visible views. So, in operation 210, back face rendering is enabled prior to rendering an image for each view.

In operation 212, for each view, a photorealistic garment image is rendered. The photorealistic image may be generated by known techniques such as raytracing. Raytracing is very resource intensive. Generating each image in real-time in response to an end-user's selection would require a great deal of resources, and cause unacceptable delays caused by the lag time required to render each image, resulting in an eCommerce system with unwanted sluggish response. In some cases, the generation of each image may result in tens of seconds of delay, directly impacting the end-user's shopping experience, possibly result the end-user giving up on purchase.

In operation 214, each garment generated image may be encoded and compressed for web usage. In some embodiments, the images may be encoded in a PNG or WebP format. In operation 216, the encoded garment images are uploaded to a storage and available for transmission to a user's device.

Figure 3:
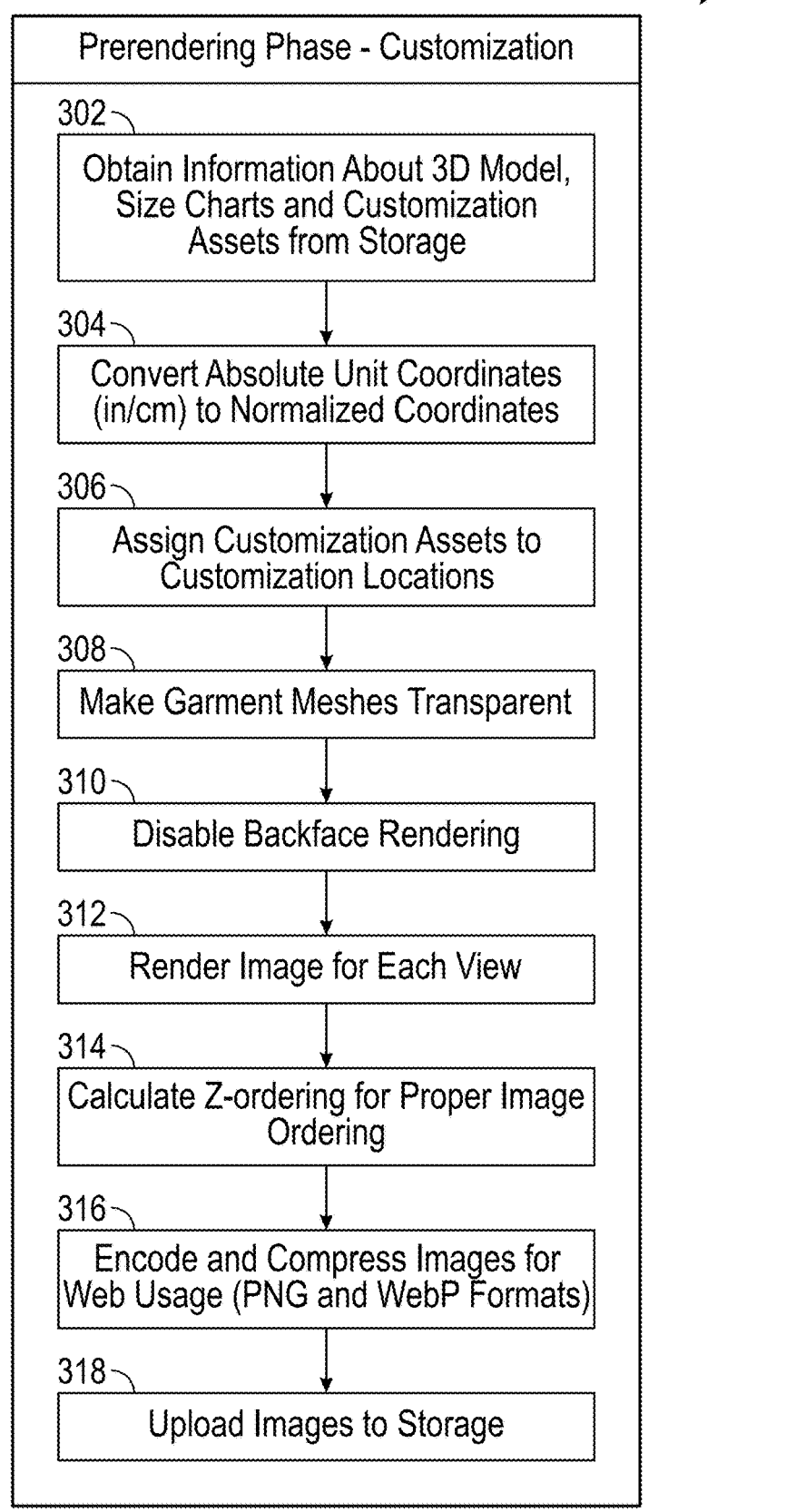
FIG. 3 illustrates a flowchart of a personalization art image creation process in accordance with one embodiment.

FIG. 3 illustrates a flowchart of a personalization art image creation process in accordance with one embodiment.

Based on the business user's input and information, for each garment, one or more personalization locations may be available. For example, the personalization art may be placed on the front chest area, the back area, on a sleeve at the shoulder location, at the side of a garment under a sleeve, etc. In process flow 300, one or more images of a personalization art is rendered for each view within a selected customization window. It should be noted that depending on the garment design, not all areas of the garment model may be suitable for customization—either due to manufacturing limitations (embroidery across multiple parts) or impracticality (e.g. monogramming in the inside of the pocket). In some embodiments, in operation 302, information regarding available customization window locations may be received from the retrieved from the 3D garment model inputted by the business user's input. Additionally, design information regarding the article including size charts, and the set allowed personalization art designs and characteristics such as size and scale may be obtained.

Depending on the style and size of a garment, the placement of the personalization art may be affected. So, in operation 304, the garment size and coordinate information that are provided in real units such as inches or centimeters are converted to a normalized measurements and coordinates. Normalization of the dimensions allows for the accurate placement of customization window location, or the location of the personalization art within the customization window regardless of the actual size and measurements of a garment.

In operation 306, a subset of allowed available selection of personalization arts are assigned to each customization location or window. The appropriate art for each customization window location may be determined by the business user. In alternative embodiments, the selection of art may be determined by the system based on the size of the art and the size of the customization window and other aesthetic criteria.

Many computer graphics tools use polygon meshes that are comprised of collections of faces, vertices and edges to render or simulate 3D models and images. Each mesh may be scaled differently and may have a different skin, to better simulate reflection of light on the surface of the garment that is being rendered. In operation 308, the one or more meshes that correspond to the customization window or the personalization art image are rendered transparent to allow for a seamless overlaying of the personalization art image on the garment image.

In some embodiments, in operation 310, the back face rendering is deactivated to enhance the visual effects and quality of the garment image in a visible view.

In operation 312, a personalization art image is rendered for each distinct combination of personalization art, customization window, personalization art view, and other parameters including the environment conditions such as lighting, the user viewpoint or camera viewpoint of the garment and/or the personalization art, and other camera settings that may affect the garment image or the personalization art image as they are being rendered.

In operation 314, Z-ordering of the parts for proper image ordering is calculated. Z-ordering determines which image appears in front of or behind which image with respect to the Z-axis extending into and out of display screen. Z-ordering is required for a proper image rendering in the case for example where the customization window is located underneath the sleeve of the selected garment. In such cases, to properly render the photorealistic garment and the personalization art image, a Z-ordering operation must be performed.

In operation 316, each rendered personalization art image corresponding to viewpoint and other parameters affecting the image are encoded and compressed (e.g. PNG or WebP formats) for web usage.

In operation 318, the generated images are uploaded to storage.

Figure 4:
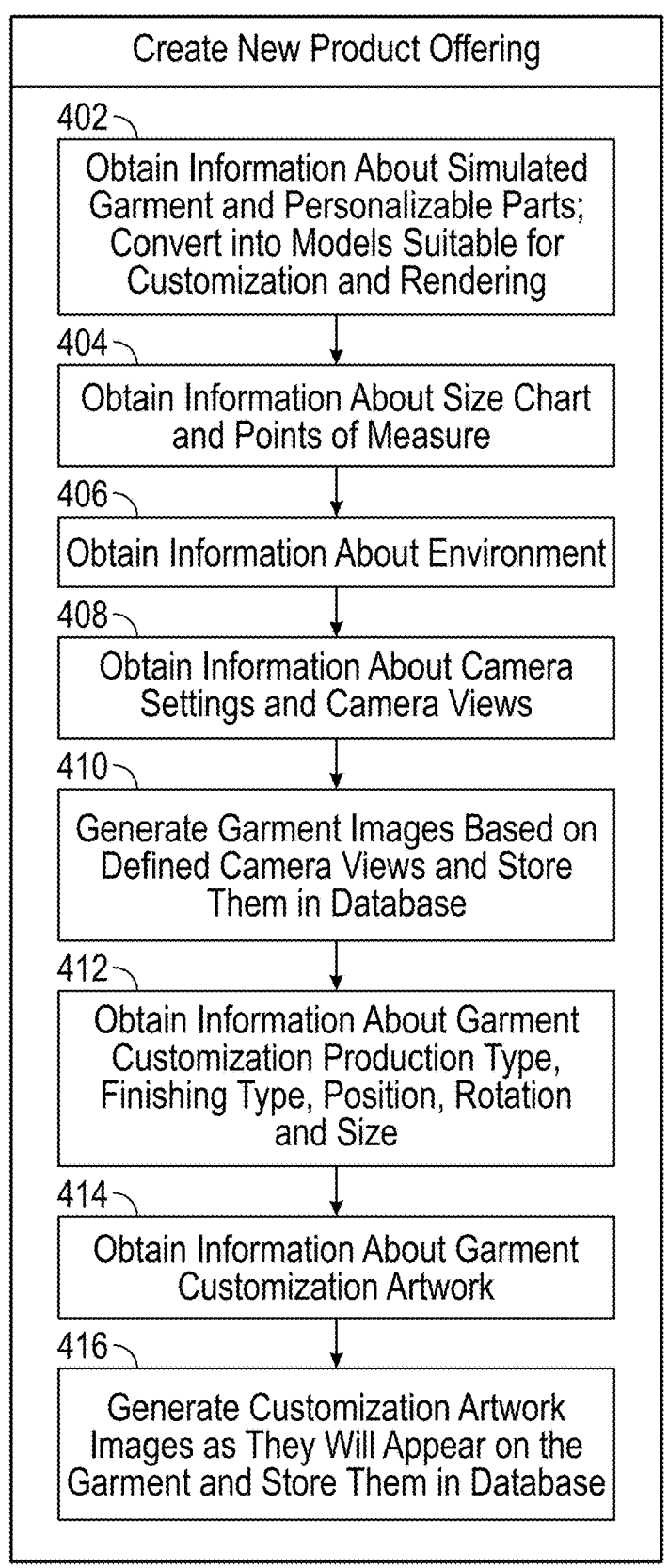
FIG. 4 illustrates a flow chart for the process of creation of a new product offering in accordance with an embodiment.

FIG. 4 illustrates a flow chart for the process of creation of a new product offering in accordance with an embodiment. Process 400 illustrates an exemplary process for the creation of a new product offering by a business user. Business user may provide information related to the new product offering including the location of the customization windows on the garment and a selection of personalization arts available for use with the new garment offering. A 3D model generator uses the garment design information to generate a 3D model of the garment. In operation 402, some or all the information provided by the business user to the 3D model generator is obtained for use by the image rendering engine to generate photorealistic images of the garment.

In operation 404, available garment size information and the corresponding size chart is received. The size chart may be supplied by the business user or extracted from existing size charts data for similar apparel.

In operation 406, business user's selection of available viewing environment corresponding to the garment is obtained. For example, the business user may limit images the garment in an indoor lighting set up only. In operation 408, information about the business user's selection of available choices of camera settings and camera views or viewpoint may be obtained.

In operation 410, for each distinct combination of environmental condition (indoor or outdoor lighting), camera setting, viewpoint, garment texture and color, etc., a photorealistic garment image is rendered. The photorealistic garment images are saved to storage for future retrieval.

In operation 412, information about the personalization art such as personalization art finishing, position, rotation, orientation, and sizes are defined. In operation 414, business user's choice of the collection of art available to personalize the new garment is received.

In operation 416, based on the available choices of personalization art, for each distinct combination of customization window, personalization art, environment conditions, viewpoint, production type, color, position and orientation, size and scale, an image of the personalization art rendered in the customization window and corresponding to the environmental and technical parameters is generated and saved to storage.

Figure 5:
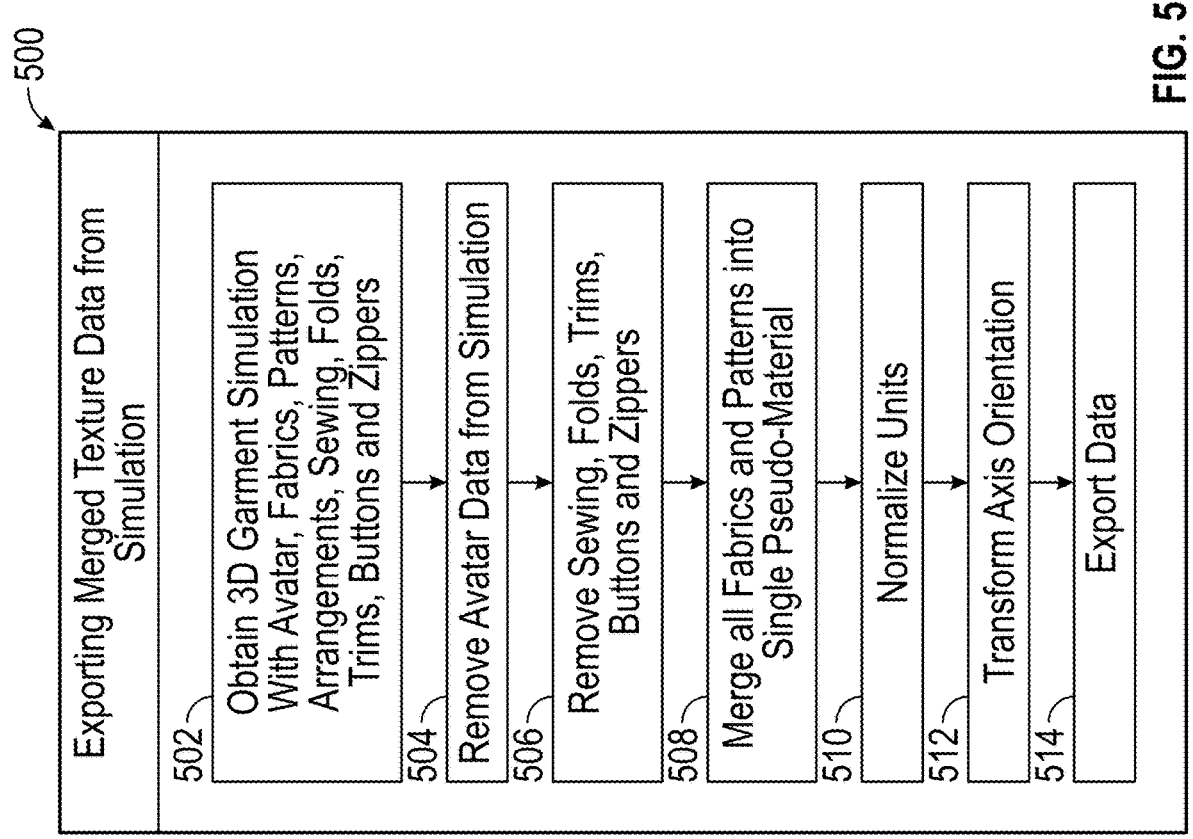
FIG. 5 illustrates a process of exporting garment image information with merged textures in accordance with an embodiment.

FIG. 5 illustrates a process of exporting garment image information with merged textures in accordance with an embodiment. When creating a new product offering, the garment design may include the use of different colors or fabrics. The use of different fabrics and colors is reflected in as textures and colors on the skin surface of the corresponding mesh. Proper rendering of images with varying textures for example, may require the use of different mesh scales in addition to the use of different mesh skin. Therefore, for many garment designs, the texture map will not be uniform across the entire surface of the garment. For example, the neckline of the garment that is in fur may use a different mesh repetition pattern than the rest of the garment that is made of wool. This non-uniform mesh scale can also affect the relative distance of or sizes of the garment parts which in turn may affect the accurate placement of customization art windows and the personalization art within the customization window.

To achieve uniformly scaled texture across the entire garment, in some cases it may be necessary to unmerge and remerge all parts of the garment into single continuous pseudo-material. This process requires that all components of the garment be separated (unmerged) first, then all sewing, folds, trims and hardware such as buttons and zippers be removed. This process is outlined in the process flow 500. It should be noted that due to the nature of this process, the garment that undergoes an unmerging and remerging process may suffer from a lower quality image as compared to garment images that did not require the unmerging and remerging process. This is due to the nature of this unmerging and remerging process.

In operation 502, 3D garment model information may be extracted from the 3D model generator. In some cases, the output of a 3D model engine may include information regarding a display model or an avatar. Additionally, the 3D garment simulation model may include information about the garment fabrics, patterns, arrangements, sewing patterns, folds, trims, buttons, pockets, zippers, etc.

In operation 504, the avatar related information is extracted and discarded. In operation 506, any sewing, folds, trims, buttons, zippers, pockets, etc. are removed from the garment model.

In operation 508, all fabrics and patterns stripped of design features such as sewing, folds, trims, etc. are merged into a single pseudo-material, with a uniform mesh scale. The resulting image from the single pseudo-material may suffer in quality.

In operation 510, the garment model image measurements and units are normalized. Normalization process is described in detail in FIG. 7A. In operation 512, the axis of orientation is transformed and set to point the positive Y-axis towards the top of the screen. And in operation, 514, the garment 3D model information with merged meshes are exported to be used by the image rendering engine to render a photorealistic image of the article. The normalization and axis orientation process will be described in more details in the description of FIG. 7A.

Figure 6:
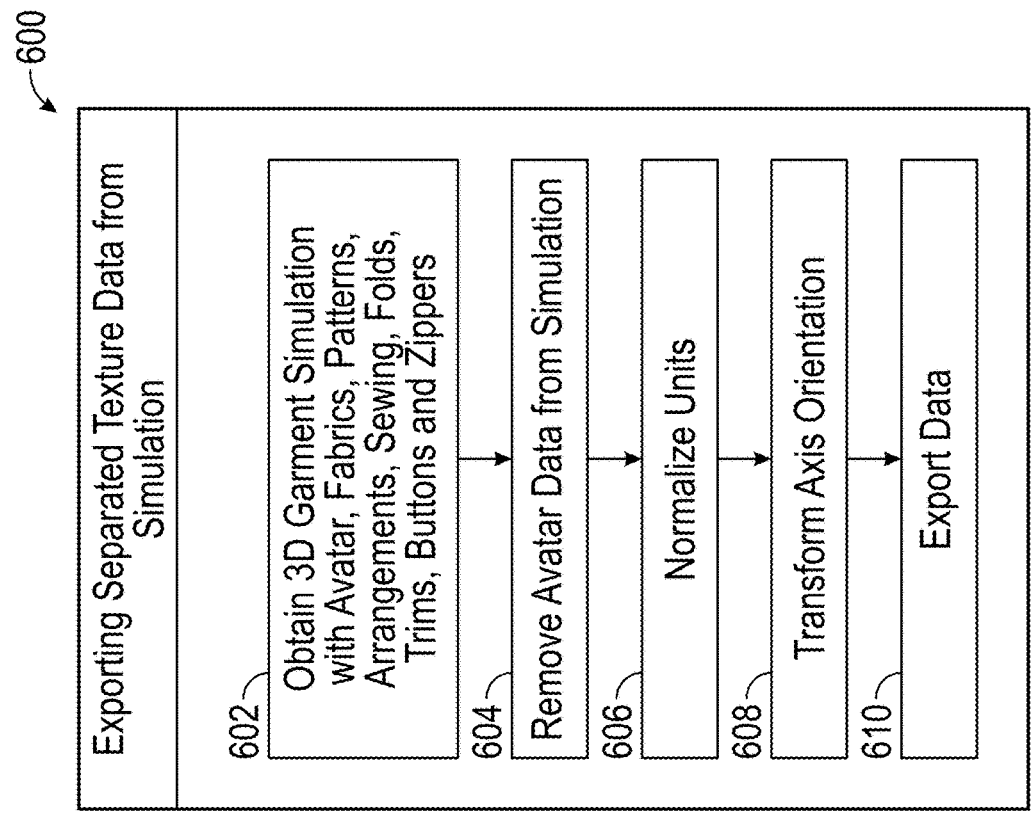
FIG. 6 illustrates a process of exporting garment information based on separated textures in accordance with one embodiment.

FIG. 6 illustrates a process of exporting garment image information based on separated textures in accordance with one embodiment. In some embodiments, a business user may create a new garment to be available for personalization and sale on the eCommerce platform. The business user may provide a variety of information regarding the new garment's style, available materials or fabrics, available colors, available sizes, available customization window locations, available choice of personalization art available for each customization window location, available garment viewing options including available lighting conditions, available camera viewpoints and garment poses, etc. Additionally, the business user may define the options available for each personalization art including the type of personalization (e.g. embroidery vs. Direct to garment printing (DTG)), available colors, available personalization art positions and scale within the customization window. The business user may also define the set of customization windows that would be allowed for the new garment type.

In some embodiments, the business user may be able to view a three-dimensional (3D) model of the newly created garment. The simulated 3D image presented to the business user may be created using commercially available tools such as Clo3D. Various techniques are used to realistically visualize a 3D representation of the garment on a 2D computer screen. Many computer graphics tools use polygon meshes comprised of a collection of faces, vertices and edges to render a 3D model or simulated image. Each mesh may be scaled differently and may have a different skin, to better simulate reflection of light on the surface of the object (the garment in this case) that is being rendered.

The process flow 600 describes an example where the 3D garment model is comprised of a single mesh scale. Since the entire garment uses the same mesh scale, the unmerging and remerging process to achieve a uniform pseudo-mesh is unnecessary in this case.

In operation 602, 3D garment model data is extracted from the 3D model generator. In some cases, the output of the 3D model engine may include information regarding a display model or avatar. Additionally, the 3D garment simulation model may include information about the garment fabrics, patterns, arrangements, sewing patterns, folds, trims, buttons, pockets, zippers, etc. All this information is collected from the 3D garment simulation model.

In operation 604, the avatar related information may be extracted and discarded. In operation 606, the garment measurements and units are normalized to allow for the accurate placement of a customization window on the garment regardless of the garment size. In operation 608, the axis of orientation is transformed and set to have the positive Y-axis set to point towards the top of the screen. And in operation, 610, the garment 3D model data is exported to the image rendering engine to create a photorealistic image of the garment.

Figure 7A:
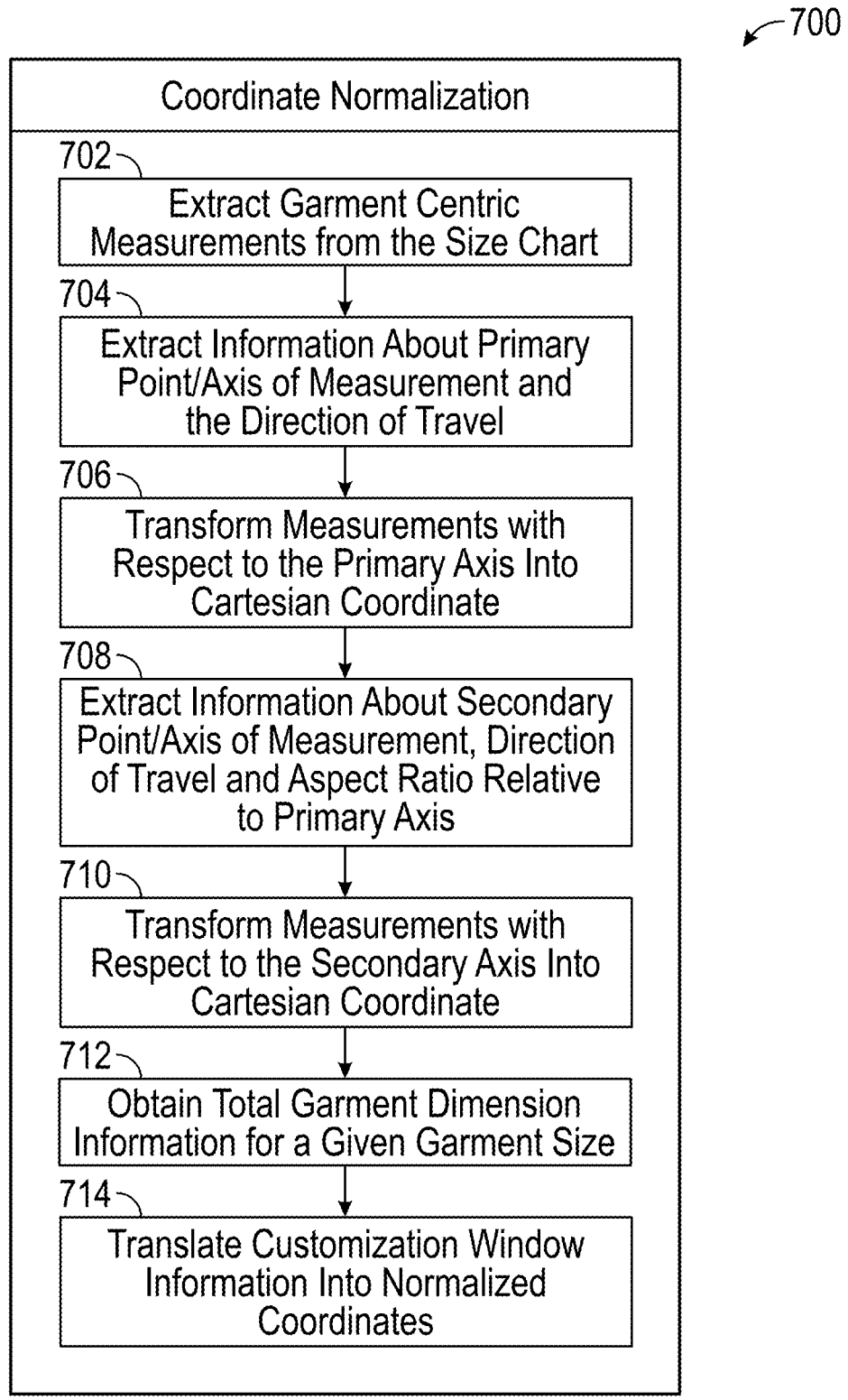
FIG. 7A illustrates a process of coordinate normalization in accordance with one embodiment.
Figure 7C:
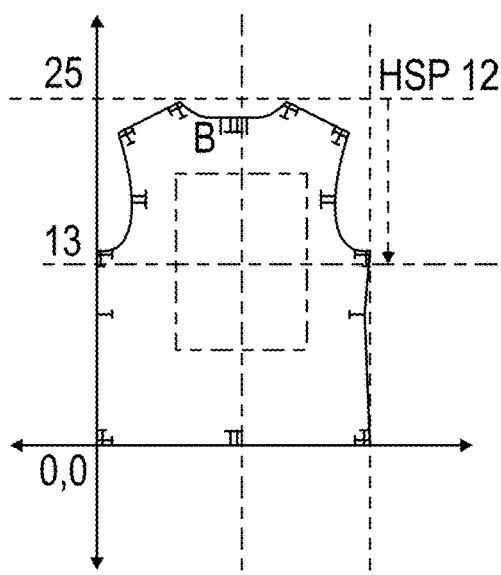
FIG. 7C illustrates exemplary location of personalization art and customization windows on article in accordance with one embodiment.
Figure 7D:
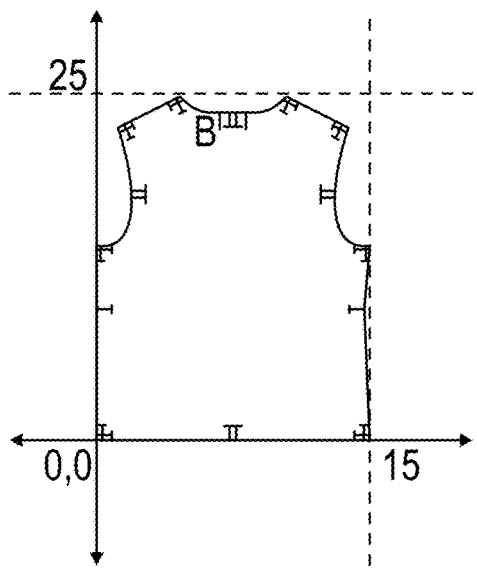
FIG. 7D illustrates exemplary location of personalization art and customization windows on an exemplary garment in accordance with one embodiment.
Figure 7E:
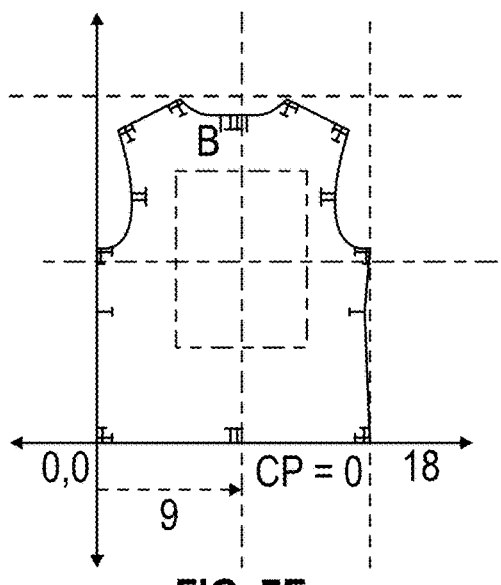
FIG. 7E illustrates exemplary location of personalization art and customization windows on article in accordance with one embodiment.

FIG. 7A illustrates a process of coordinate normalization in accordance with one embodiment. FIG. 7B illustrates an exemplary size chart in accordance with one embodiment. FIG. 7C-7E illustrate additional exemplary garment centric measurements in accordance with one embodiment. Coordinate normalization according to the exemplary process flow 700 may be required to provide accurate placement of customization art images on the garment and within the customization window regardless of the garment size, customization window size and customization window location.

Figure 11:
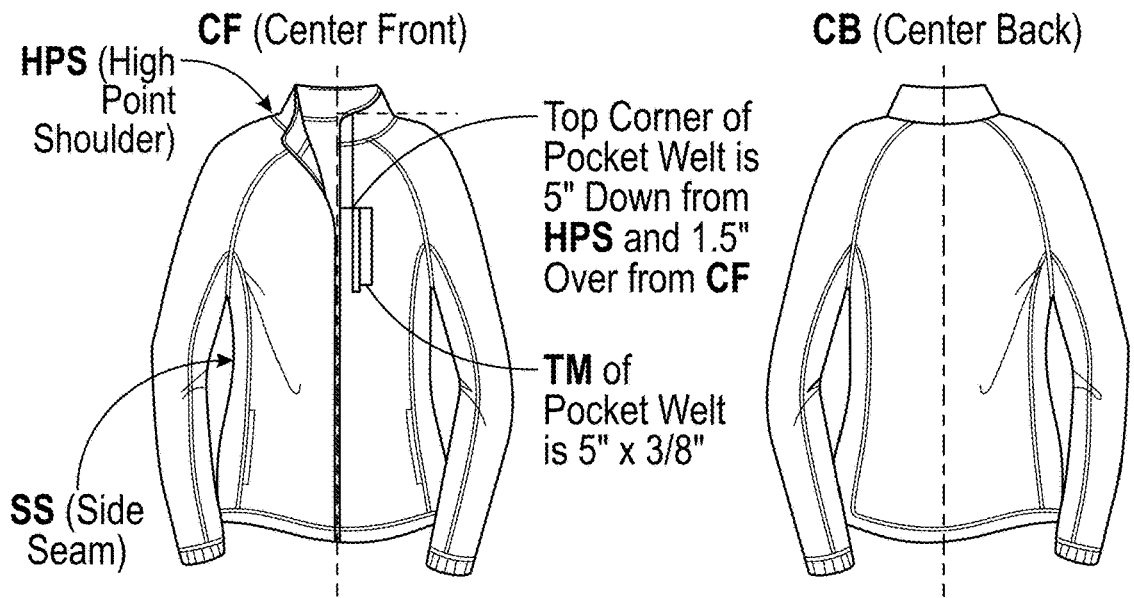
FIG. 11 illustrates exemplary garment centric measurements in accordance with one embodiment.

To accurately determine customization window location on a 2-D garment panel (e.g. right front panel of a T-Shirt) a two dimensional coordinate system is required including two axes, one vertical and one horizontal. A cartesian coordinate system would be preferred as it is customarily and widely used in in computer graphics. However, it is customary for garment designers to use garment centric points of measurements and reference all dimensions in this garment centric coordinate system. So, for example, an exemplary size chart may provide measurements in terms of distances measured from a reference point on the garment such as High Shoulder Point and Center point as depicted in FIG. 11.

Therefore, garment specific coordinate measurements must be translated into a cartesian coordinate system. Furthermore, since it is a desired feature of the system to be able to display customization art in the appropriate location, regardless of the actual size of the garment, the translated cartesian coordinates for an exemplary customization window location must be normalized for accurate placement within any size garment.

In operation 702, a size chart corresponding to the new product offering, in this case a new garment is received. The garment size chart may be provided by the business user at the time of the creation of a new product offering, or an existing garment size chart corresponding to an article like the new product offering may be used. An exemplary size chart is shown in FIG. 7B.

In operation 704, the garment size chart dimensions and various other data may be collected including primary points of measurement, primary axis, point of origin of measurements, and direction of measurement. As depicted in FIG. 7c. The primary axis may be the HSP shown as located at +25 units from the origin (0,0) on the Y-axis, and the secondary axis CP is shown as located +9 units from the origin (0,0) on the X-axis. The size chart may also provide a direction of travel in reading garment centric measurements with respect to the garment points of reference.

In operation 706, the primary garment points of measurement expressed in garment centric terms, are converted to measurements in a cartesian coordinates system. So, customization window location measurements expressed in distances from primary and secondary axis in the garment centric system are translated into cartesian coordinates as measured from the (0,0) point of origin. With reference to FIG. 7C, the figure depicts a garment size small (S) with High Shoulder Point (HSP) dimension of 25 inches (as measured from the hemline) and the center of customization placement window measured 12 inches down from the HSP axis for the garment of size S. In some embodiments, the measurements shown in FIG. 7C translate to HSP being located at +25 units on the Y-axis and CP located at +9 on the X-axis. So, in cartesian coordinates, of the center of the customization window is located at +13 units along the Y-axis and +9 units along the X-axis.

In operation 708, secondary axis origin points, directions of travel and aspect ratio relative to the primary axis may be extracted from the size chart. So, in the example of the garment depicted in FIG. 7C, the secondary axis is identified CP located +9 units from the origin (0,0) on the X-axis. The direction of travel may be right or left in the garment centric measurements and would get translated into cartesian coordinate measurements.

In some cases, various garment centric dimensions may be expressed by using an aspect ratio of the secondary axis with respect to the primary axis. For example, the customization window of the garment can be translated into a single axis dimension. For example, the front panel of the garment shown in FIG. 7D, can be enclosed by a rectangle of size 20×15. Another interpretation of this measurement can be stated in terms of the horizontal axis having an aspect ratio of 0.6 with respect to the vertical axis and therefore, only the length along the vertical axis and an aspect ratio are required to perform all the calculations, including accurate placement of the customization art within the customization window, and the accurate placement of the customization window within the garment.

In operation 710, the secondary garment point of measurement measured along the secondary axis is transformed into garment centric measurement units such as inches or centimeters. The secondary axis of customization window placement in garment centric measurement units is transformed into the secondary axis of garment using the secondary axis of size chart point of measurement. For example, in FIG. 7E, depicts a garment size S having its Center Point (CP) located at zero, in the middle of the garment, with a garment width of −9 to 9 units as measured from the CP and extended on either side of CP, and with the center of customization window located at zero (0) units from the CP. This means that CP's axis is the vertical axis of the garment and the origin point in the customary coordinate is in the middle of garment. Translated into the cartesian coordinates system, the CP axis is located 9 units from the vertical Y-axis and along the positive X-axis direction.

In operation 712, the total garment dimension is calculated. This means, the maximum boundaries from the primary and secondary point of measurement for the selected garment size is measured in garment centric measurement units such as inches or centimeters. In the example above, for the garment size S of FIG. 7C, this will translate into 25 inches from HSP (ranging from 0-25 inches high) and −9 to +9 inches from CP or 18 inches wide.

In operation 714, all garment centric measurements are transformed into normalized cartesian coordinates. For example, using all the primary and secondary points of measurement, direction of travel information, etc., it is possible to obtain boundaries for each of the garment parts (e.g. front, side, back and sleeves panels of a jacket) in terms of texture mapping coordinates $P_{min}$ and $P_{max}$ expressed in the cartesian coordinates. Subtracting these values will give size of the garment $S=P_{max}-P_{min}$ which corresponds to the size of the garment in inches or centimeters. Normalize the center point of the customization window would result in dimensions that are independent of the size of the garment. To achieve normalization, the coordinates of the center point of the customization window are be divided by the total size of the garment along each cartesian axis. In the depicted example of FIG. 7C and FIG. 7E, the customization location is centered on S=(13, 9) in cartesian coordinate are divided by the total dimensions of the garment (25, 18) yielding (13/25;9/18) or S=(0.52, 0.5) in a normalized in the cartesian coordinate system.

After normalization of the units and coordinates, following the operations 512 and/or 608, the axes of the garment pieces are oriented to set the garment orientation along the positive Y-axis positive X-axis (primary and secondary point of measurements).

FIG. 7B illustrates an exemplary size chart in accordance with one embodiment. The size chart provides garment centric measurements such as the HPS and CP measurements.

FIG. 7C illustrates exemplary location of personalization art and customization windows on an exemplary garment in accordance with one embodiment. The measurements of the garment and the customization window are expressed in the garment centric dimensions.

FIG. 7D illustrates exemplary location of personalization art and customization windows on article in accordance with one embodiment. FIG. 7D illustrates the size and boundaries of an exemplary garment of size S.

FIG. 7E illustrates exemplary location of personalization art and customization windows on article in accordance with one embodiment. The measurements of the garment and the customization window are expressed with respect to a cartesian coordinate.

Figure 8:
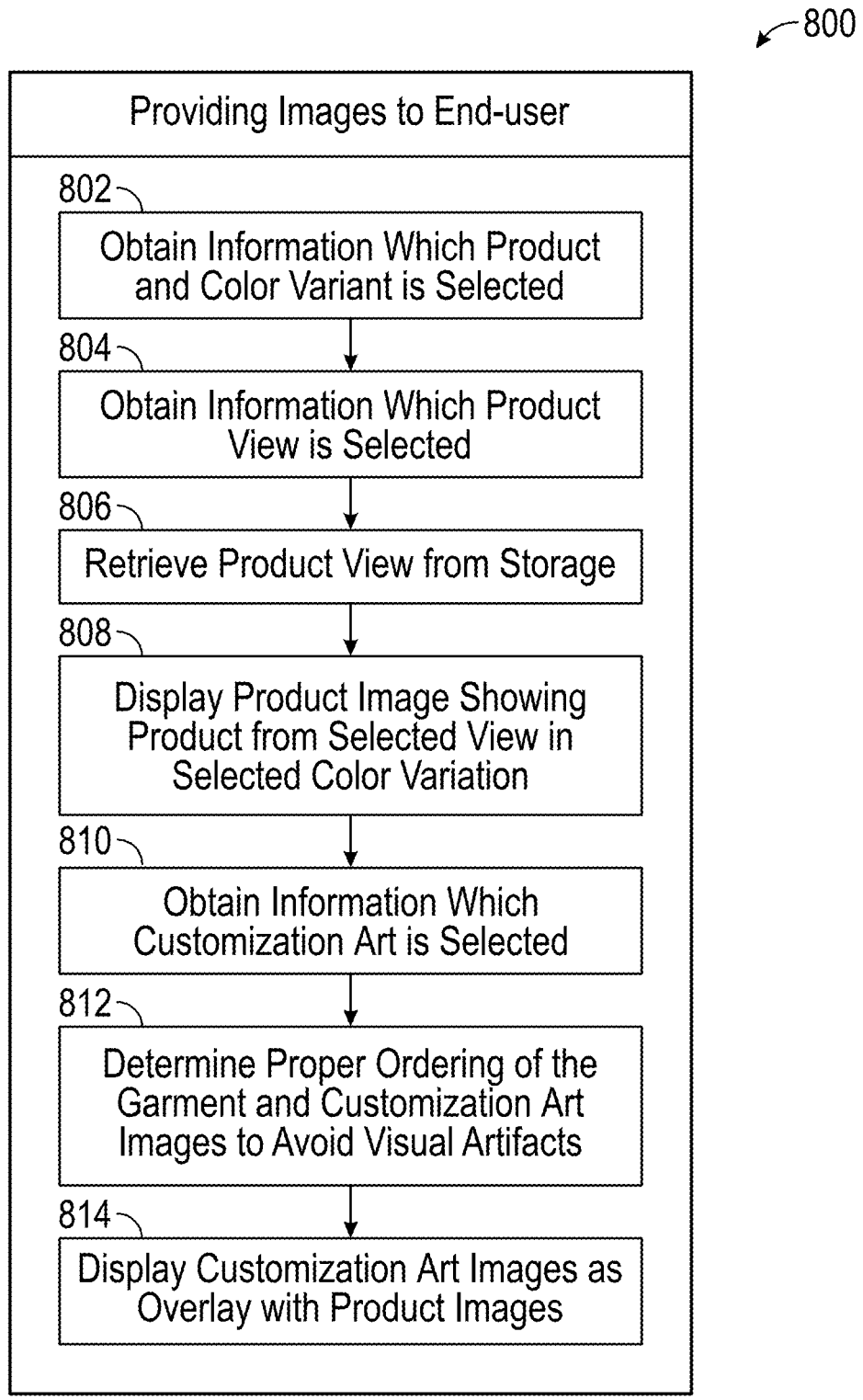
FIG. 8 illustrates a process for an end-user interaction with an eCommerce system in accordance with one embodiment.

FIG. 8 illustrates a process for an end-user interaction with an eCommerce system in accordance with one embodiment. An end-user may be a customer that arrives on the system landing site by being redirected from the website of a retailer, manufacturer, wholesaler, or a brand owner. In many cases, an end-user would be redirected to the eCommerce system 100 landing page because he or she is seeking to purchase a garment that he or she intends to personalize with his or her selection of personalization art. Garment personalization is becoming more popular. However, one of the challenges personalization presents is providing an end-user shopping experience that provides a customer experience as close as possible to the real-life shopping experience, increasing the user's confidence in his or her purchase.

Process flow 800 illustrates an exemplary embodiment of providing images of the garment alone and as embellished with user selected personalization art. In operation 802, the end-user's selections of the garment, the color and other garment design selection input is received by the system 100. In operation 804, the end-user input regarding the selected garment view is received.

In operation 806, based on the end-user selection of the garment and the garment view, color, and other image selection options, a corresponding garment image is retrieved from the database and in operation 808, the garment image is displayed at the end-user's terminal.

In operation 810, the end-user selection of the personalization art is received. In operation 812, the per the design Z-ordering of the garment image and the personalization art image is calculated for proper displaying of the garment image personalized with the end-user selected art.

In operation 814, the image of the selected personalization art is overlaid on the garment image and displayed on the end-user's terminal.

Figure 9:
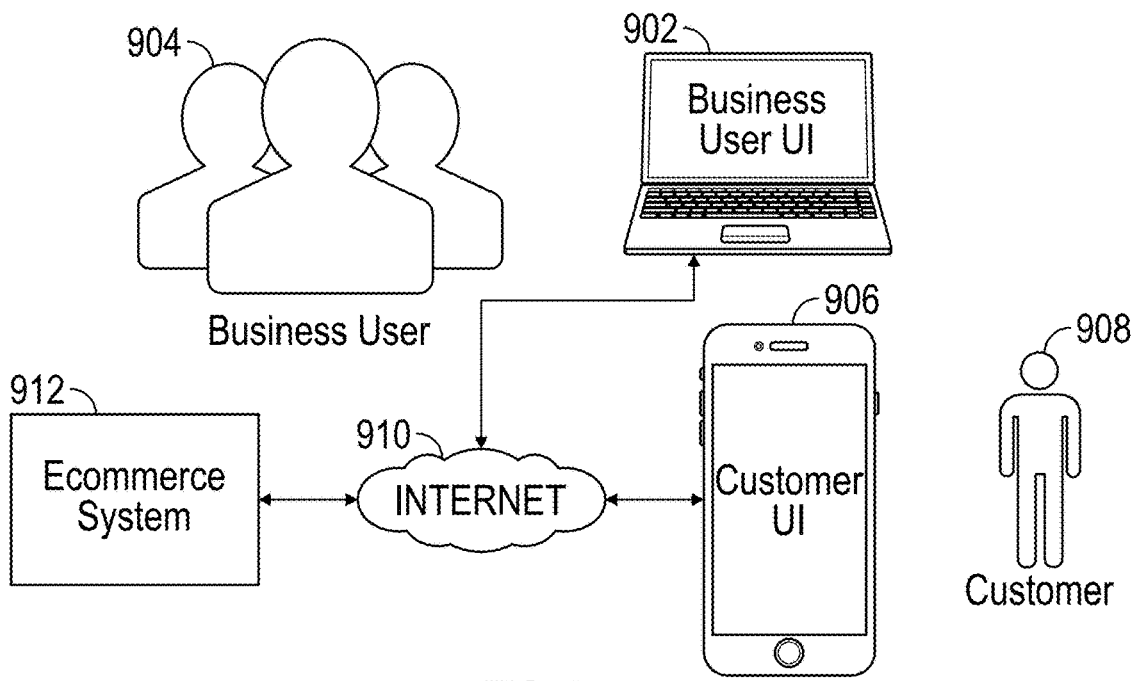
FIG. 9 illustrates an exemplary eCommerce platform in accordance with one embodiment.

FIG. 9 illustrates an exemplary eCommerce platform in accordance with one embodiment. In the exemplary eCommerce system shown in FIG. 9, one or more business users 904 may use the eCommerce platform 912 via business specific user interfaces 902 to create a portfolio of new products, to be made available to end-user or Customers 908 for purchase as is or as personalized with user selected personalization art. In some embodiments, a business user 904 may access the eCommerce system 912 remotely and directly through the Internet 910. In some embodiments, the business user 904 may reach the eCommerce system 912 by accessing the a business user's website and being redirected to the eCommerce system 912. In some embodiments, once a business user 904 has created an account, the business user 904 may have full access to all the eCommerce systems 912 features and be able to create a portfolio of desirable garments. In alternative embodiments, the business user 904 may be required to pay for one or more components of the eCommerce system 912 on an as needed basis or subscription basis.

In some embodiments, once a business user 904 has created a portfolio of articles available for purchase and customization by end-user Customers 908, it may redirect traffic from its own website to the eCommerce system 912 if an end-user Customer 908 indicates that he or she is interested in personalizing their purchase. In some embodiments, an end-user customer may use one of several available user interfaces 906 including accessing through the Internet 910 using a smart phone, a personal computer, or a terminal located at a brand owner or retailer's store.

In some embodiments, the eCommerce platform may limit access to a portfolio of available articles and personalization art based on the explicit choices made by the business user 904 when creating its portfolio of merchandise. In some embodiments, the eCommerce system 912 may limit access to merchandise and personalization art based on how the end-user Customer 908 lands on the eCommerce website.

Figure 10:
FIG. 10 illustrates an exemplary article available for purchase and customization on the eCommerce platform of system 100 in accordance with one embodiment.

FIG. 10 illustrates an exemplary article available for purchase and customization on the eCommerce platform of system 100 in accordance with one embodiment. The article available for customization using the system 100 may be an article of clothing as shown in FIG. 10. It should be noted that the teaching of the present disclosure is not limited to articles of clothing and can be applied to other articles, including accessories, and any item that may be customizable after its manufacture. In some embodiments, the garment shown in FIG. 10 may include a garment tag that identifies the brand owner and any other information that may be required to be displayed including size and style. In some embodiments, the garment of FIG. 10 is a photorealistic image of the actual article, rendered using techniques such as raytracing that allow for the generation of photorealistic images of the article.

FIG. 11 illustrates exemplary garment centric measurements in accordance with one embodiment. As shown in FIG. 11, in some embodiments, relevant dimensions may be measured with respect to reference points on the garment. For example, certain dimensions in a size chart for a given garment may be measured with respect to the high point shoulder (HPS), center front (CF) or a side seam (SS). For example, the decorative pocket location is measured as such: top corner pocket located 5 inches below HPS and 1.5 inches from CF, and the bottom or TM of the pocket is 5 and ⅜ inches from HPS. Similarly, another potential garment centric reference point for measurements is the center back (CB) of the garment as shown in FIG. 11.

Figure 12:
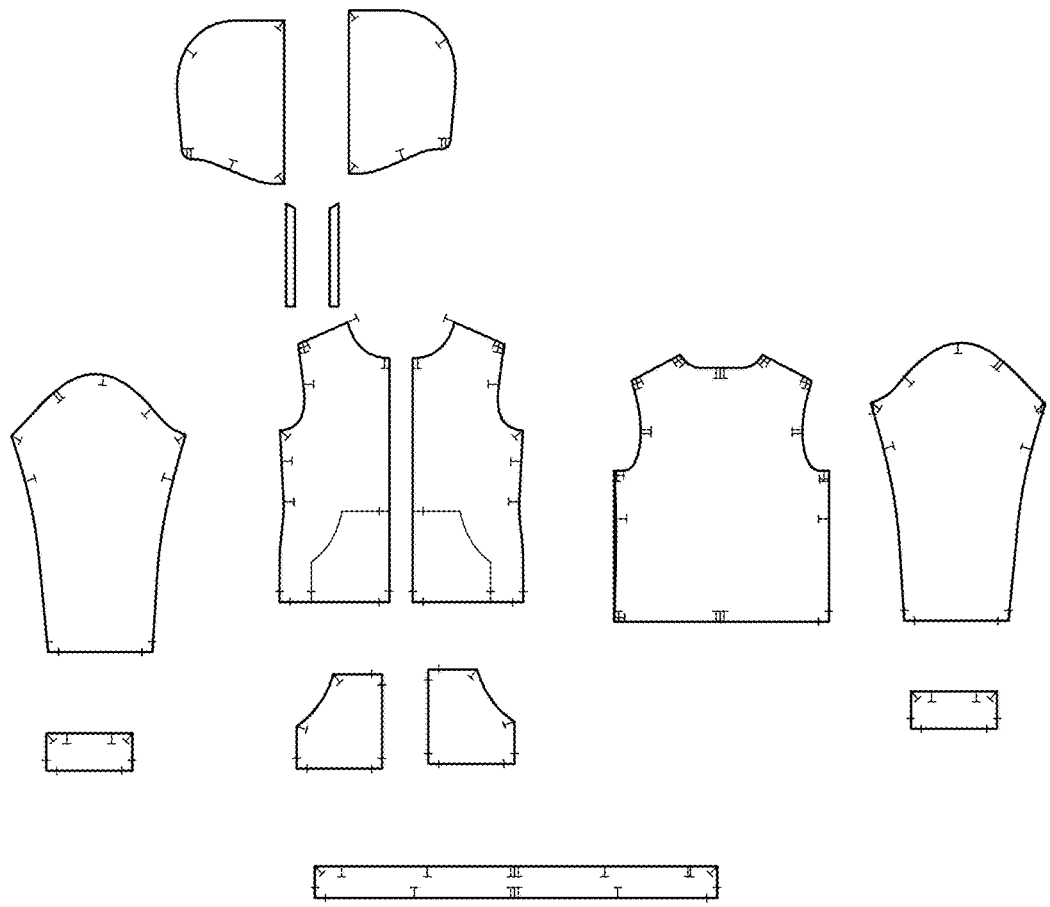
FIG. 12 shows an exemplary illustration of various components of the garment of FIG. 11 in accordance with one embodiment.

FIG. 12 shows an exemplary illustration of various components of the garment of FIG. 11 in accordance with one embodiment. The garment of FIG. 11 may be deconstructed into its various components, including the front, back, right, and left body panels, the sleeves, the collar, pockets, and hemline sections, etc. In some embodiments, various components of the garment may be composed of different materials and thus the underlying mesh structure representing that garment structure, and fabric may be formed with mesh scale that is different from other components' mesh scales. In some embodiments, the garment may be decomposed into its various components, and components may be reconstructed under a uniform mesh scale, before reconstructing the garment by combining its components.

Figure 13:
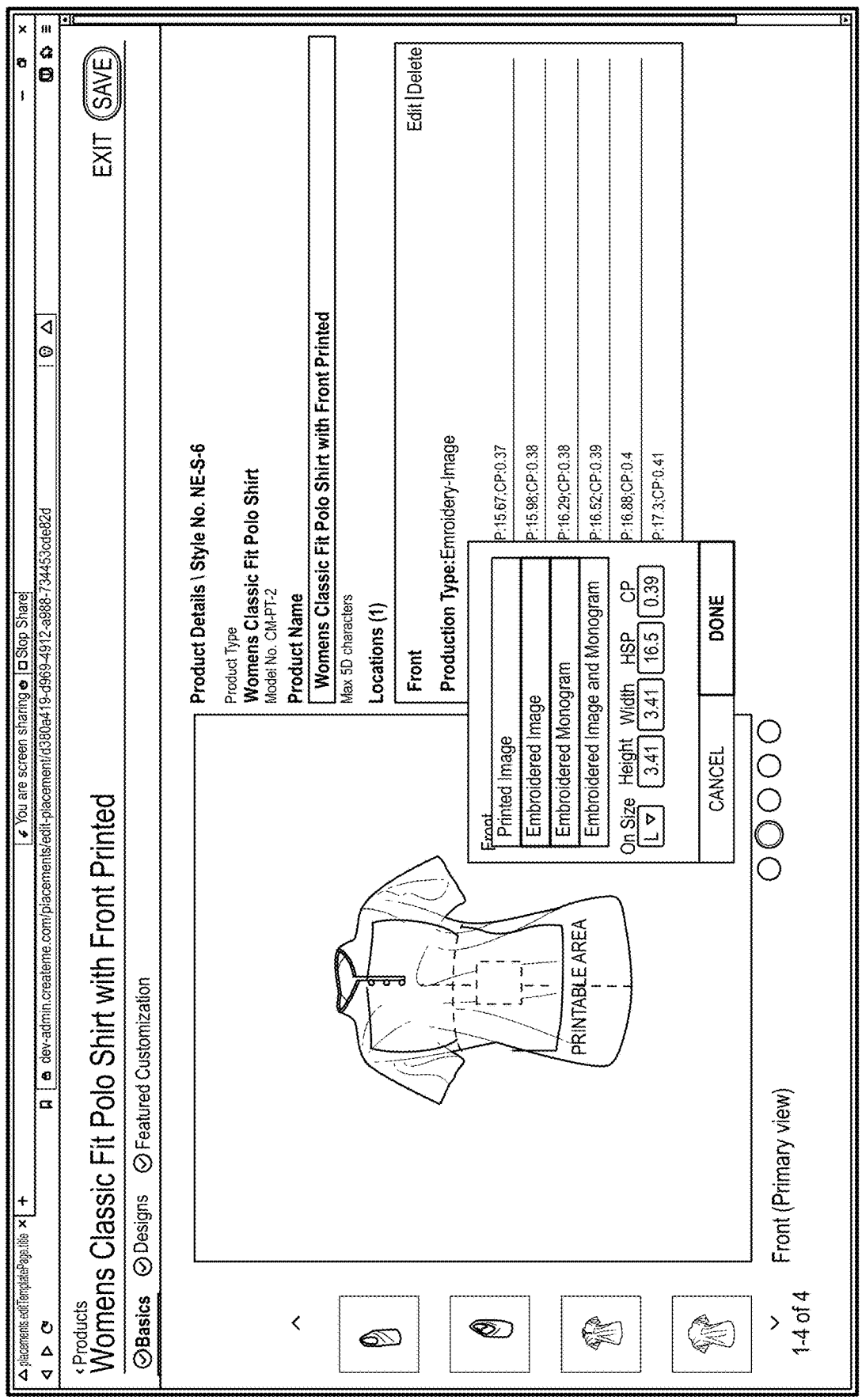
FIG. 13 illustrates exemplary webpage an end-user may visit on the eCommerce platform in accordance with exemplary embodiments.

FIG. 13 illustrates exemplary webpage an end-user may visit on the eCommerce platform in accordance with exemplary embodiments. FIG. 13-17 illustrates exemplary various screenshots as an end-user may travel through the eCommerce platform in accordance with exemplary embodiments. As shown in FIG. 13-17, an end-user may navigate through the eCommerce system and to select a garment, a customization window, a personalized art. The user may change his or her selections and view his or her different selections illustrated in new representative images.

Figure 14:
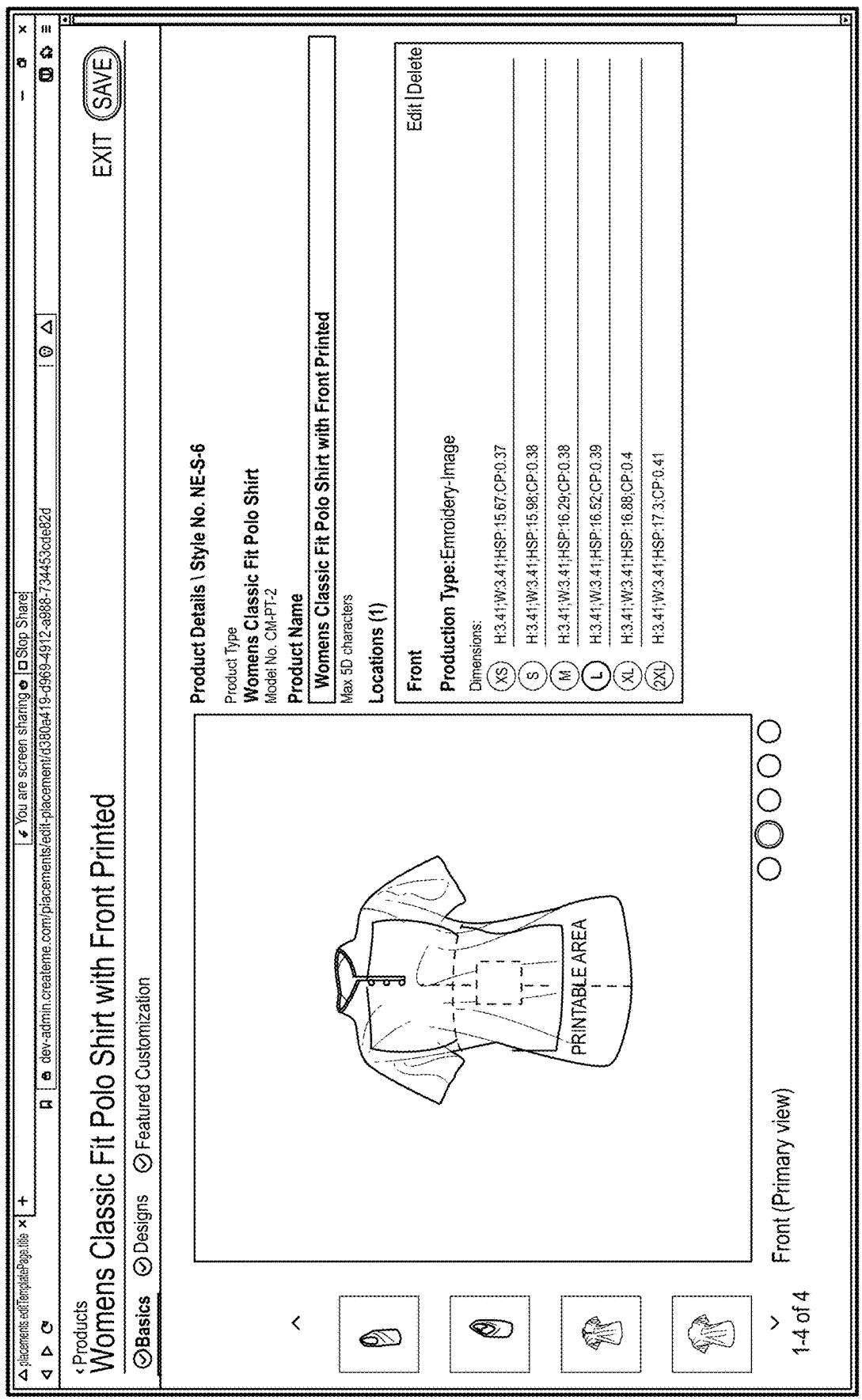
FIG. 14 illustrates exemplary webpage an end-user may visit on the eCommerce platform in accordance with exemplary embodiments.

FIG. 14 illustrates exemplary webpage an end-user may visit on the eCommerce platform in accordance with exemplary embodiments.

Figure 15:
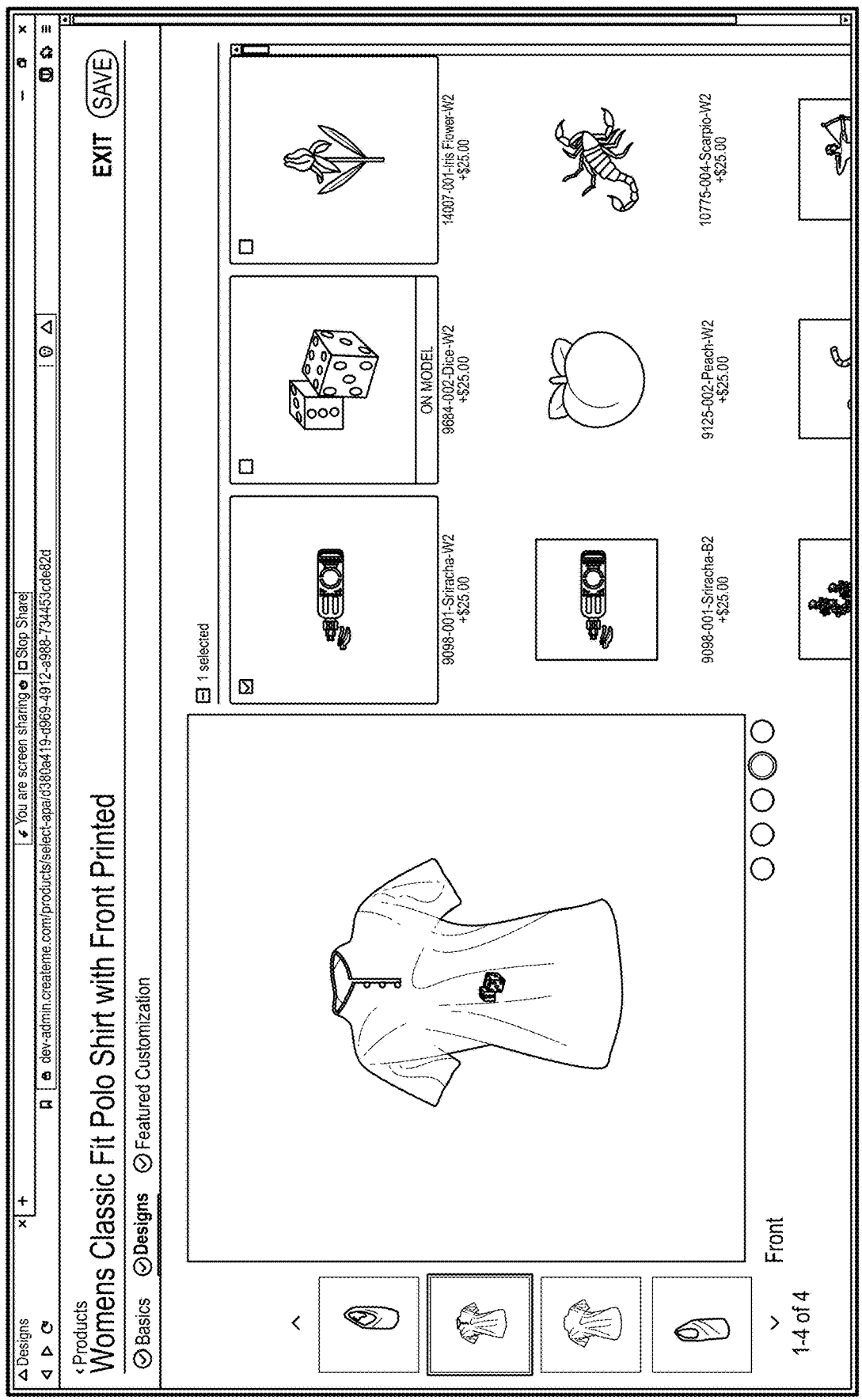
FIG. 15 illustrates exemplary webpage an end-user may visit on the eCommerce platform in accordance with exemplary embodiments.

FIG. 15 illustrates exemplary webpage an end-user may visit on the eCommerce platform in accordance with exemplary embodiments.

Figure 16:
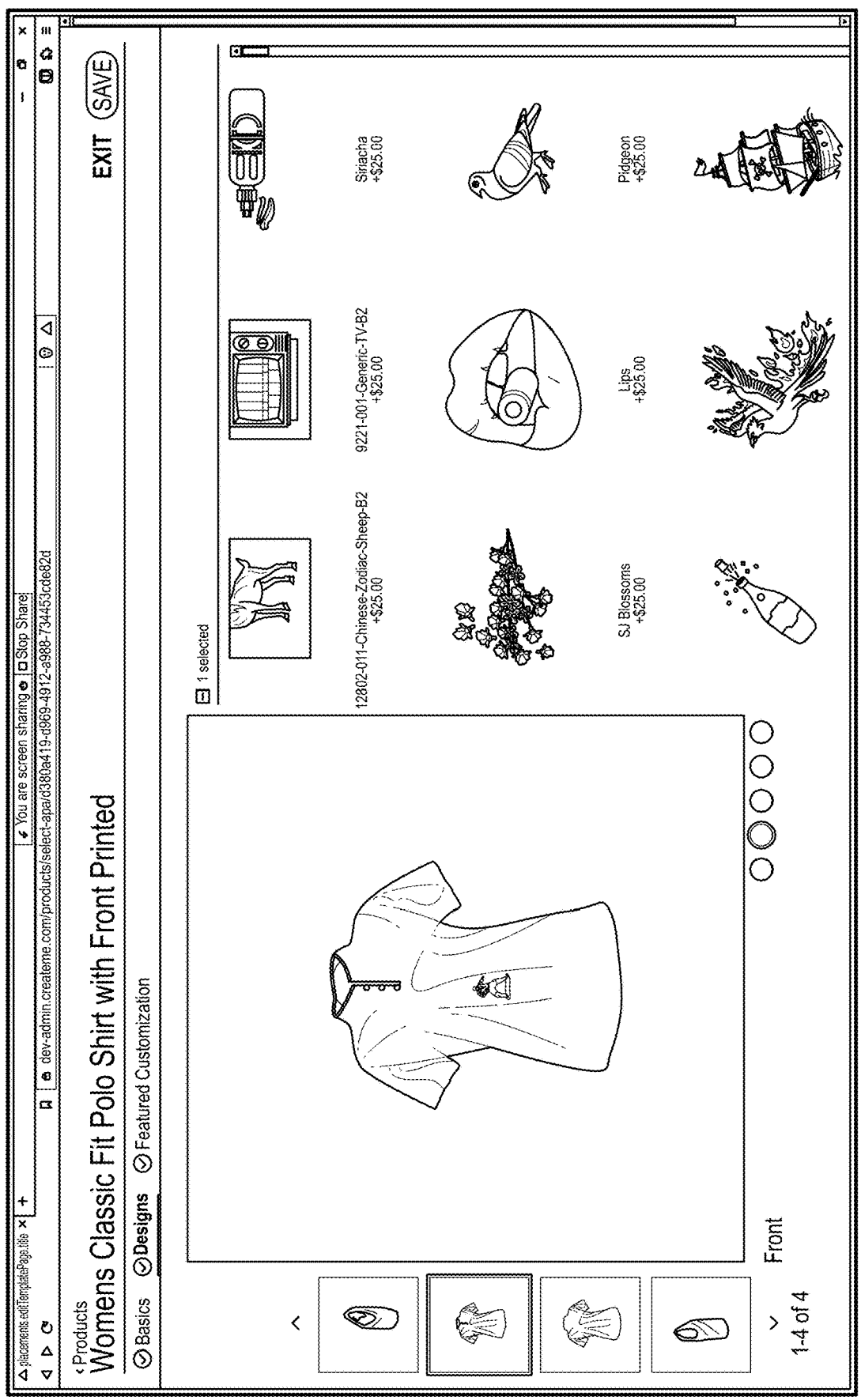
FIG. 16 illustrates exemplary webpage an end-user may visit on the eCommerce platform in accordance with exemplary embodiments.

FIG. 16 illustrates exemplary webpage an end-user may visit on the eCommerce platform in accordance with exemplary embodiments.

Figure 17:
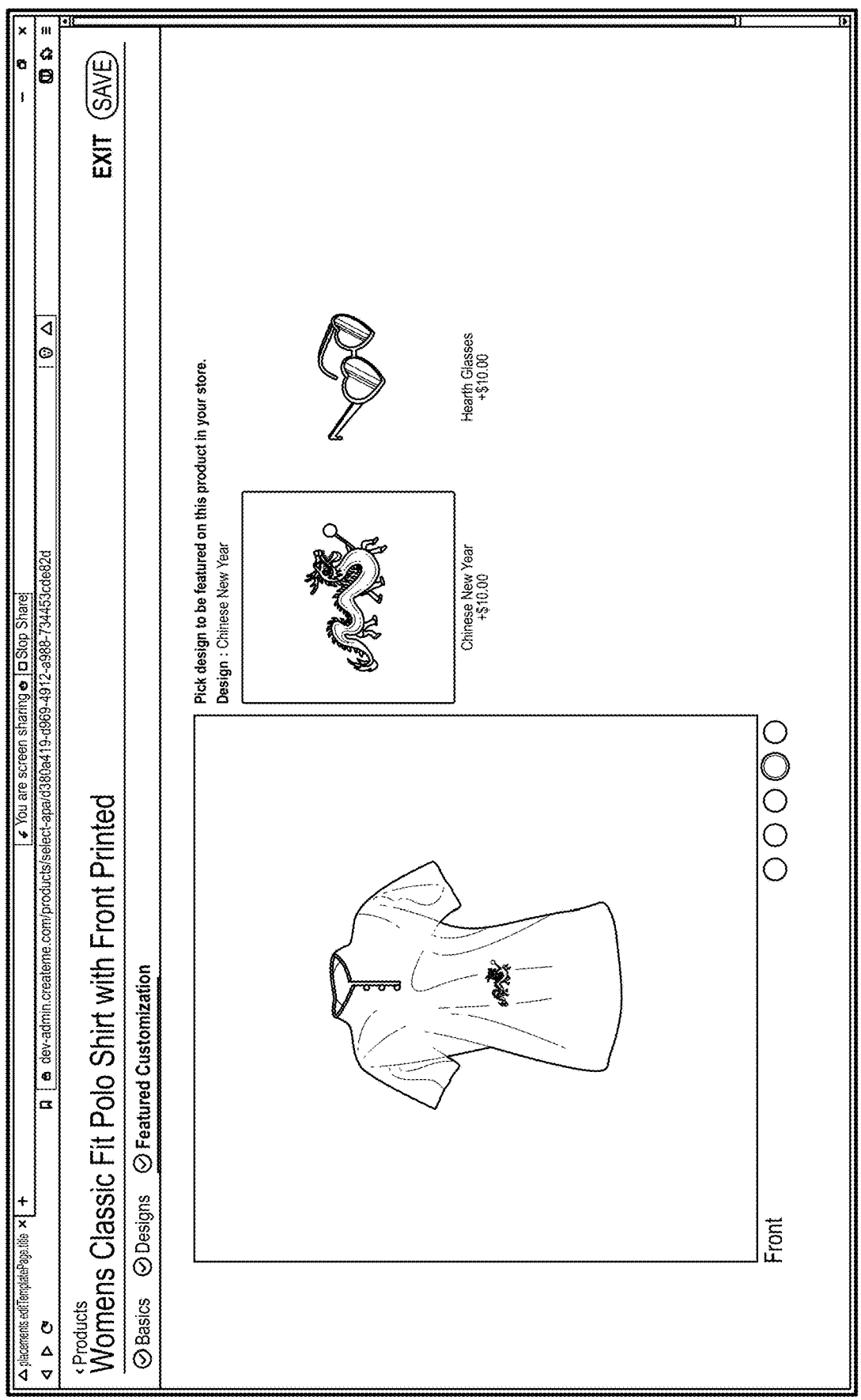
FIG. 17 illustrates exemplary webpage an end-user may visit on the eCommerce platform in accordance with exemplary embodiments.

FIG. 17 illustrates exemplary webpage an end-user may visit on the eCommerce platform in accordance with exemplary embodiments.

Figure 18:
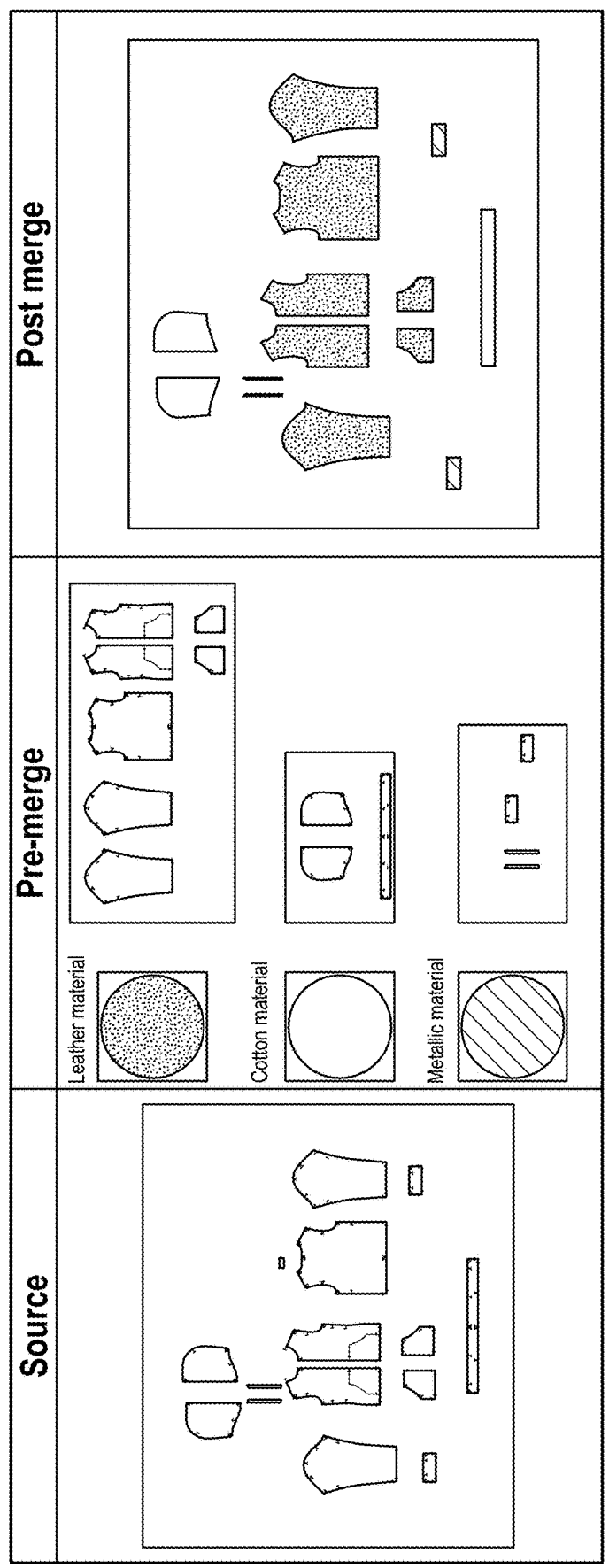
FIG. 18 illustrates exemplary panels illustrating a garment deconstruction and reconstruction to achieve a uniform mesh scale according to an exemplary embodiment.

FIG. 18 illustrates exemplary panels illustrating a garment deconstruction and reconstruction to achieve a uniform mesh scale according to an exemplary embodiment.

Figure 19:
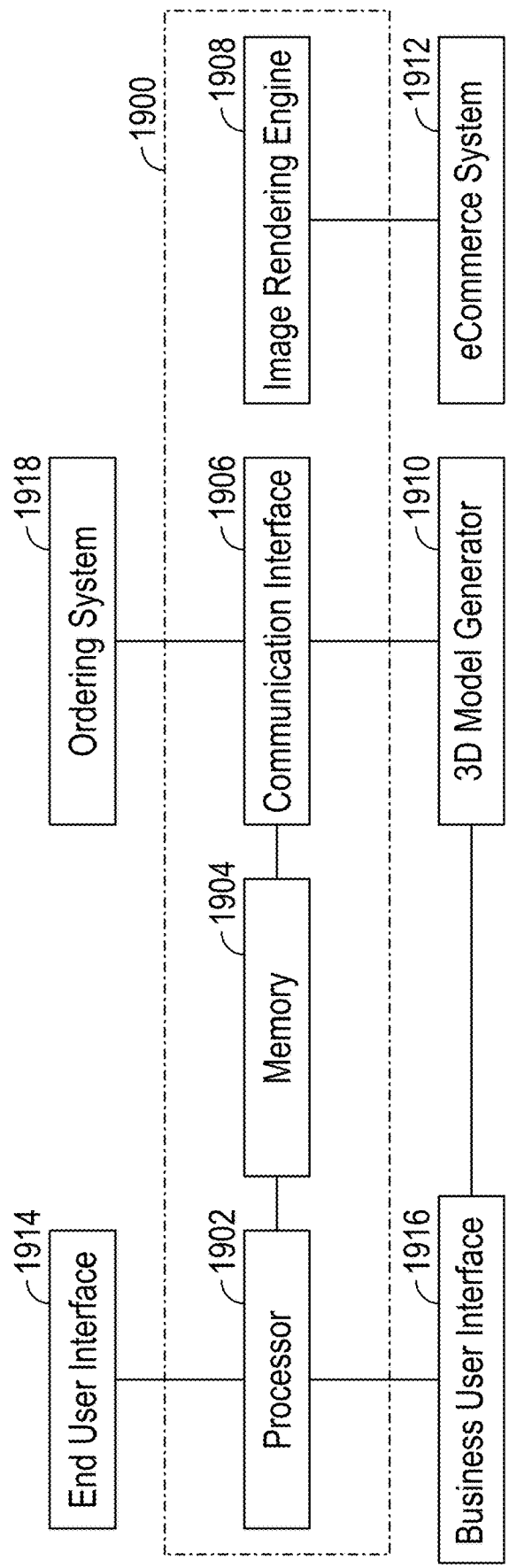
FIG. 19 illustrates an aspect of the subject matter in accordance with one embodiment.

FIG. 19 illustrates an exemplary block diagram of an image rendering system 1900 according to exemplary embodiments of the present invention.

In some embodiments, the illustrative image rendering system 1900 includes an eCommerce System 1918 coupled to various components including one or more Ordering System 1916, one or more Business user Interfaces 1914 and one or more End User Interfaces 1912. In some embodiments, the image rendering system 1900 may include one or more Processors 1902 coupled to memory 1904 and one or more communication interfaces 1906 to provide means for communicating with Business user Interfaces 1914 and End User Interfaces 1912.

In some embodiments, the image rendering system 1900 may be implemented at least partially in one or more computers, embedded systems, terminals, control stations, handheld devices, modules, any other suitable interface devices, or any combination thereof. In some embodiments, the components of image rendering system 1900 may be communicatively coupled via one or more communications buses not shown here.

Processors 1902 may include one or more Processors 1902 (e.g., a central processing unit), cache, random access memory (RAM), read only memory (ROM), any other suitable components, or any combination thereof that may process information regarding the image rendering system 1900. Memory 1904 may include any suitable volatile or non-volatile memory that may include, for example, random access memory (RAM), read only memory (ROM), flash memory, a hard disk, any other suitable memory, or any combination thereof. Information stored in memory 1904 may be accessible by Processor 1902 via communications bus not shown. For example, computer readable program instructions (e.g., for implementing the techniques disclosed herein) stored in memory 1904 may be accessed and executed by processing equipment 1902. In some embodiments, memory 1904 includes a non-transitory computer readable medium for storing computer executable instructions that cause Processors 1902 (e.g., processing equipment of a suitable computing system), to carry out a method for controlling the automated garment manufacturing systems and processes. For example, memory 1904 may include computer executable instructions for implementing any of the control techniques described herein.

In some embodiments, communication interfaces 1906 includes a wired connection (e.g., using IEEE 802.3 ethernet, or universal serial bus interface protocols), wireless coupling (e.g., using IEEE 802.11 "Wi-Fi," Bluetooth, or via cellular network), optical coupling, inductive coupling, any other suitable coupling, or any combination thereof, for communicating with one or more systems external to image rendering system 1900. For example, communication interface 1906 may include a USB port configured to accept a flash memory drive. In a further example, communication interface 1906 may include an Ethernet port configured to allow communication with one or more devices, networks, or both. In a further example, communication interface 1906 may include a transceiver configured to communicate using 4G standards over a cellular network.

In some embodiments, End User Interface 1912 or Business user Interface 1914 includes a wired connection (e.g., using IEEE 802.3 ethernet, or universal serial bus interface, tip-ring-seal RCA type connection), wireless coupling (e.g., using IEEE 802.11 "Wi-Fi," Infrared, Bluetooth, or via cellular network), optical coupling, inductive coupling, any other suitable coupling, or any combination thereof, for communicating with one or more of End User Interfaces 1912 or Business user Interfaces 1914. End User Interfaces 1912 and Business user Interfaces 1914 may include a display, keyboard, mouse, audio device, any other suitable user interface devices, or any combination thereof. For example, a display may include a display screen such as, for example, a cathode ray tube screen, a liquid crystal display screen, a light emitting diode display screen, a plasma display screen, any other suitable display screen that may provide graphics, text, images or other visuals to a user, or any combination of screens thereof. Further, a display may include a touchscreen, which may provide tactile interaction with a user by, for example, offering one or more soft commands on a display screen. In a further example, End User Interfaces 1912 and Business user Interfaces 1914 may include a keyboard such as a QWERTY keyboard, a numeric keypad, any other suitable collection of hard command buttons, or any combination thereof. In a further example, End User Interfaces 1912 and Business user Interfaces 1914 may include a mouse or any other suitable pointing device that may control a cursor or icon on a graphical user interface displayed on a display screen. In a further example, End User Interfaces 1912 and Business user Interfaces 1914 may include an audio device such as a microphone, a speaker, headphones, any other suitable device for providing and/or receiving audio signals, or any combination thereof. In some embodiments, End User Interfaces 1912 and Business user Interfaces 1914 need not be included (e.g., control module 801 need not receive user input nor provide output to a user).

In some embodiments, an eCommerce System 1918 (aka eCommerce system 912) may be a proprietary eCommerce system or a publicly available third-party eCommerce system such as Shopify that provides a platform for manufacturers, wholesalers, retailers and brand owners to create a portfolio of available products that may be available for sale as is or as embellished with user selected personalization art. In some embodiments, the eCommerce Systems 1918 may be in communication with the image rendering engine or with the memory 1904 to receive high quality garment images embellished with high quality personalization art images based on end-user selections.

In some embodiments, business users 904 may create a new product offering (e.g. a new apparel). The business user 904 using the Business user Interface 1914 may provide design related information of the new apparel to the eCommerce System 1918 and image rendering engine 1908. In some embodiments, the business user 904's design related information may be used by 3D model generator 1910 to generate a 3D model or image of the new apparel, to help visualize the business user's 904 creation. In addition to the apparel design details, the business user 904 may select customization windows and personalization art available to embellish the apparel. In some embodiments, the 3D model or image from the 3D model generator and other business user 904 information and selections including available apparel sizes and available customization windows and available personalization art to generate high quality images of the new product alone and embellished with end-user selected personalization art. In some embodiments, the 3D model generator 1910 may be a proprietary tool developed internally. In some embodiments, a commercially available 3D model generator tool such as Clo3D may be used. In either case, the image rendering engine 1908 may interact with the 3D model generator 1910 in various ways to generate apparel images that have very high fidelity to the physical product.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments but should be defined only in accordance with the following claims and their equivalents.

What is claimed is:

1. A method of generating garment images embellished with a personalization art image, the method comprising:
    receiving a request to create a garment, the request including information related to garment parts color options, and garment parts fabric options;
    receiving a selection of lighting conditions, camera viewpoints and poses related to the garment;
    generating a garment part image for each distinct combination of a garment part fabric, a garment part color, a lighting condition, a camera viewpoint and a pose;
    creating a garment image for the garment from each distinct combination of garment parts and storing each garment image;
    receiving a selection of customization windows corresponding to the garment;
    receiving a selection of personalization arts for each customization window, wherein each personalization art provides for at least one of a choice of personalization art production type, of personalization art finishing, of personalization art position, of personalization art scale;
    for each customization window, generating a personalization art image for each distinct combination of the art production type, of the personalization art finishing, of the personalization art position, of the personalization art scale, and each combination of the lighting condition, the camera viewpoint and the pose;
    receiving a size chart information related to a garment size, wherein the size chart information is expressed in one or more garment centric measurements;
    using the size chart information, defining a customization window location in the one or more garment centric measurements for the garment size;
    translating the customization window location in the one or more garment centric measurements to measurements in a cartesian coordinate system;
    using the size chart information, calculating one or more garment dimensions in the garment centric measurements;
    translating the garment size in the one or more garment centric measurements to a width along an X-axis of the cartesian coordinate system and a height along a Y-axis of the cartesian coordinate system;
    dividing an X-axis coordinate of the customization window location by the width and a Y-axis coordinate of the customization window location by the height to normalize the coordinates of the customization window location;
    receiving instructions to display a selected garment image, embellished with a selected personalization art located in a selected customization window; and
    transmitting the selected garment image overlaid with the selected personalization art located within the selected customization window.

2. The method of claim 1 further comprising:
    generating an image of the customization window corresponding to the garment image;
    receiving instructions to display the garment image; and
    transmitting the selected garment image overlaid with the image of the customization window.

3. The method of claim 1 further comprising:
    calculating a z-ordering of the garment part image and the personalization art; and
    generating the garment part image and the personalization art based on the calculated z-order.

4. The method of claim 1 further comprising: colorizing the selected personalization art transparent.

5. The method of claim 1 further comprising:
disabling backface rendering prior to generating a simulated customization art image.

6. The method of claim 1 further comprising:
receiving a simulated 3D garment image;
unmerging each simulated 3D garment image mesh from the simulated 3D garment image;
removing all simulated garment design features from all simulated 3D garment image meshes;
causing all simulated 3D garment image meshes to equal one mesh scale;
merging all simulated 3D garment image meshes; and
generating the garment image based on a single mesh.

7. The method of claim 1 further comprising:
assigning a logo to a garment image label.

8. The method of claim 1 further comprising:
enabling backface rendering before generating an image of the garment; and
disabling the backface rendering before generating an image of the personalization art.

9. A method of providing a garment image overlaid with a user selected personalization art image, the method comprising:
receiving a garment selection and one or more garment properties including: design, color, material, size, at least one customization window, at least one personalization art, pose, position, rotation, viewpoint and camera setting;
for each distinct combination of garment properties, generating and storing an image of the selected garment;
for each distinct combination of garment properties, generating and storing a personalization art image within the customization window, wherein the customization window location is normalized for all garment sizes, and wherein the personalization art image is colorized in a transparent color;
receiving a size chart information related to a garment size, wherein the size chart information is expressed in one or more garment centric measurements;
using the size chart information, defining a customization window location in the one or more garment centric measurements for the garment size;
translating the customization window location in the one or more garment centric measurements to measurements in a cartesian coordinate system;
using the size chart information, calculating one or more garment dimensions in the garment centric measurements;
translating the garment size in the one or more garment centric measurements to a width along an X-axis of the cartesian coordinate system and a height along a Y-axis of the cartesian coordinate system;
dividing an X-axis coordinate of the customization window location by the width and a Y-axis coordinate of the customization window location by the height to normalize the customization window location coordinates;
receiving a request to display the garment image overlaid with the personalization art image located within the customization window; and
transmitting the stored selected garment image overlaid with the personalization art image located within the customization window.

10. A computing apparatus comprising:
a processor; and
a memory storing instructions that, when executed by the processor, configure the apparatus to:
receive a request to create a garment, the request including information related to garment parts color options, and garment parts fabric options;
receive a selection of lighting conditions, camera viewpoints and poses related to the garment;
generate a garment part image for each distinct combination of a garment part fabric, a garment part color, a lighting condition, a camera viewpoint and a pose;
create a garment image for the garment from each distinct combination of garment parts and storing each garment image;
receive a selection of customization windows corresponding to the garment;
receive a selection of personalization arts for each customization window, wherein each personalization art provides for at least one of a choice of personalization art production type, of personalization art finishing, of personalization art position, of personalization art scale;
for each customization window, generate a personalization art image for each distinct combination of the art production type, of the personalization art finishing, of the personalization art position, of the personalization art scale, and each combination of the lighting condition, the camera viewpoint and the pose;
receive size chart information related to a garment size, wherein the size chart information is expressed in one or more garment centric measurements;
using the size chart information, define a customization window location in the one or more garment centric measurements for the garment size;
translate the customization window location in the one or more garment centric measurements to measurements in a cartesian coordinate system;
use the size chart information, calculating one or more garment dimensions in the garment centric measurements;
translate the garment size in the one or more garment centric measurements to a width along an X-axis of the cartesian coordinate system and a height along a Y-axis of the cartesian coordinate system;
divide an X-axis coordinate of the customization window location by the width and a Y-axis coordinate of the customization window location by the height to normalize the coordinates of the customization window location;
receive instructions to display a selected garment image, embellished with a selected personalization art located in a selected customization window; and
transmit the selected garment image overlaid with the selected personalization art located within the selected customization window.

\* \* \* \* \*